INVENTORS
Ivan V. Coleman
Robert T. Evans
BY C. A. Gulbrandsen
Atty.

INVENTORS
Ivan V. Coleman
Robert T. Evans
BY
C. A. Gullbrandsen
Atty.

June 9, 1964 I. V. COLEMAN ETAL 3,136,862

CALL DISCRIMINATING ARRANGEMENT FOR AUTOMATIC TOLL TICKETING TELEPHONE SYSTEM

Filed Dec. 5, 1960 12 Sheets-Sheet 3

INVENTORS
Ivan V. Coleman
Robert T. Evans

BY C. A. Gulbrandsen
Atty

INVENTORS
Ivan V. Coleman
Robert T. Evans
BY C. A. Gulbrandsen
Atty.

INVENTORS
Ivan V. Coleman
Robert T. Evans
BY C. A. Gulbrandsen
Atty.

June 9, 1964 I. V. COLEMAN ETAL 3,136,862

CALL DISCRIMINATING ARRANGEMENT FOR AUTOMATIC TOLL TICKETING TELEPHONE SYSTEM

Filed Dec. 5, 1960 12 Sheets-Sheet 6

INVENTORS
Ivan V. Coleman
Robert T. Evans

BY C. A. Gulbrandsen
Atty.

INVENTORS
Ivan V. Coleman
Robert T. Evans
BY
C. A. Gulbrandsen
Atty.

INVENTORS
Ivan V. Coleman
Robert T. Evans
BY
C. A. Gulbrandsen
Atty.

INVENTORS
Ivan V. Coleman
Robert T. Evans
BY C. A. Gulbrandsen
Atty.

June 9, 1964 I. V. COLEMAN ETAL 3,136,862

CALL DISCRIMINATING ARRANGEMENT FOR AUTOMATIC TOLL TICKETING TELEPHONE SYSTEM

Filed Dec. 5, 1960 12 Sheets-Sheet 10

INVENTORS
Ivan V. Coleman
Robert T. Evans

BY C. A. Gulbrandsen
Atty.

INVENTORS
Ivan V. Coleman
Robert T. Evans
BY C. A. Gullbrandsen
Atty.

INVENTORS
Ivan V. Coleman
Robert T. Evans
BY
C. A. Gulbrandsen
Atty.

United States Patent Office 3,136,862

Patented June 9, 1964

3,136,862

CALL DISCRIMINATING ARRANGEMENT FOR AUTOMATIC TOLL TICKETING TELEPHONE SYSTEM

Ivan V. Coleman, Naperville, and Robert T. Evans, Oak Park, Ill., assignors to Automatic Electric Laboratories, Inc., Northlake, Ill., a corporation of Delaware Filed Dec. 5, 1960, Ser. No. 73,682
3 Claims. (Cl. 179—18)

Figure 1:
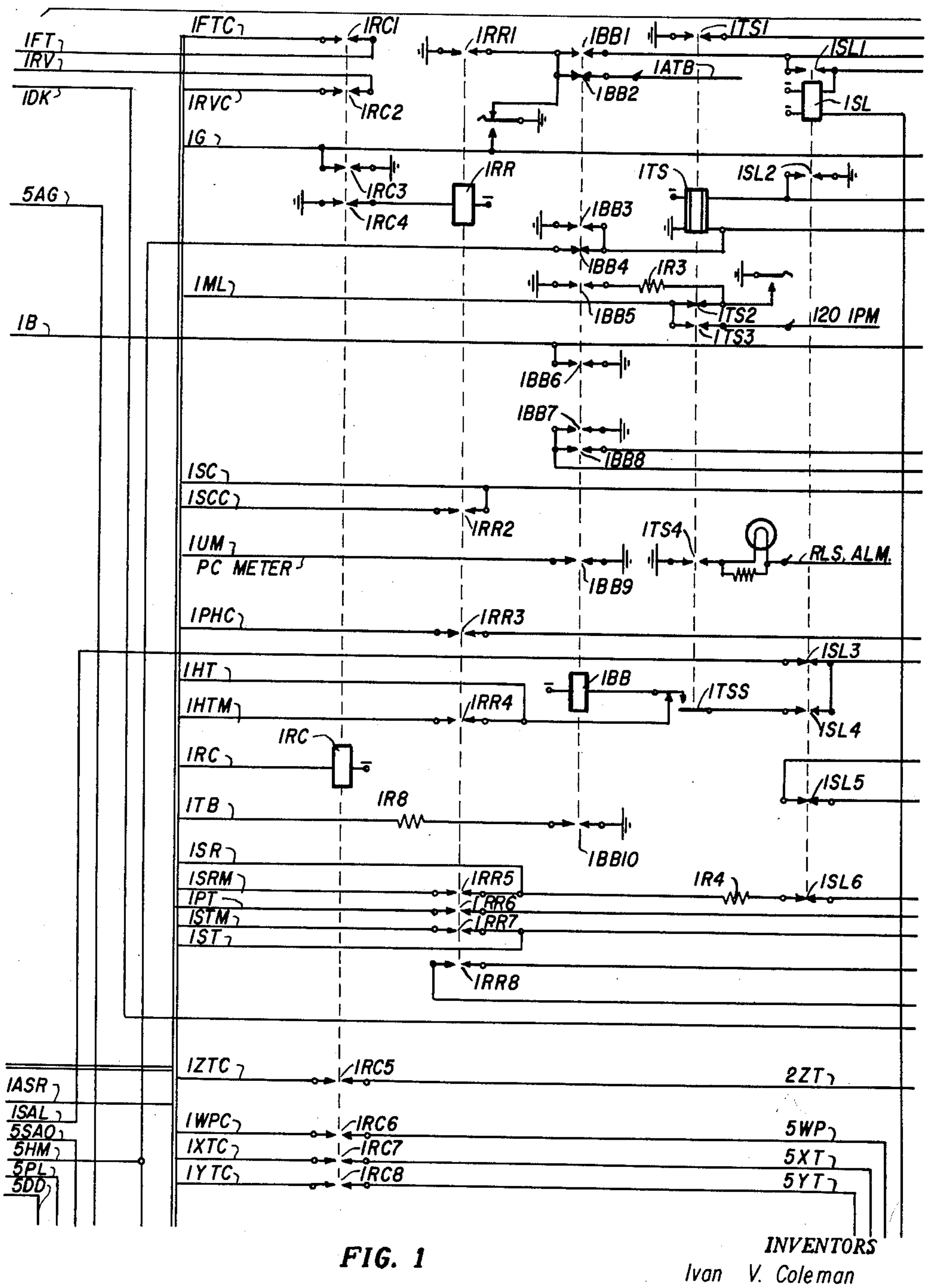
Figure 2:
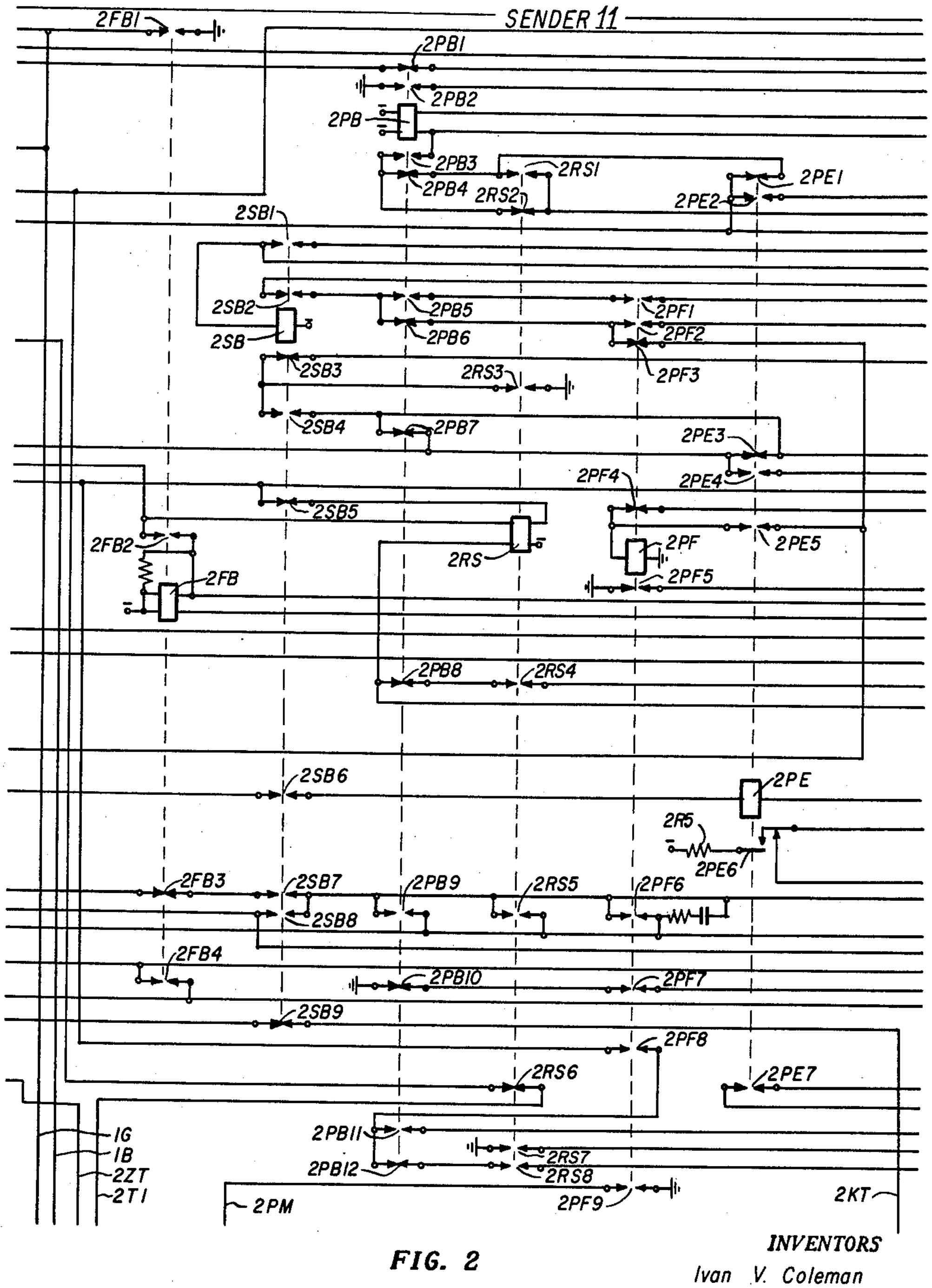
Figure 3:
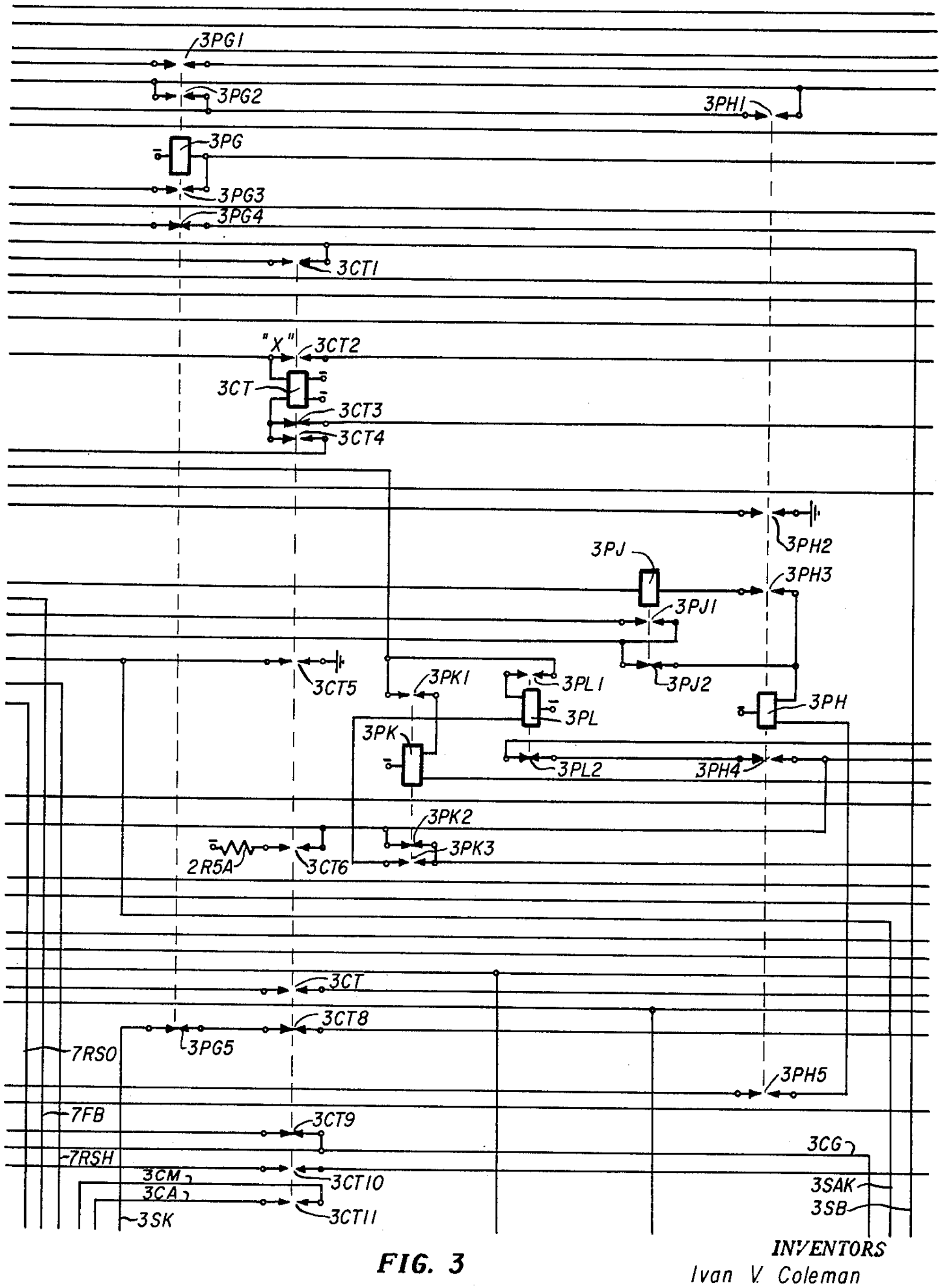
Figure 4:
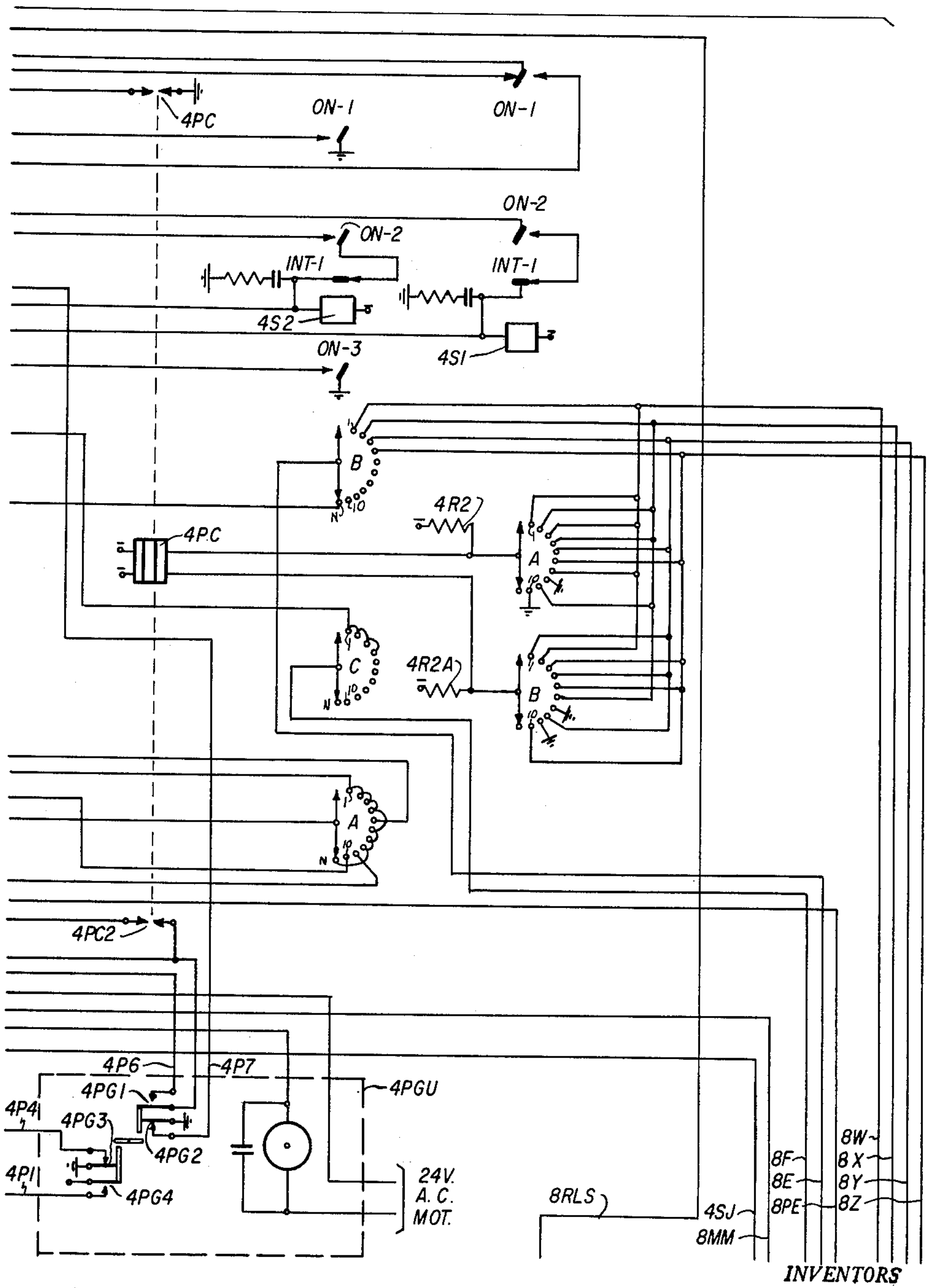
Figure 5:
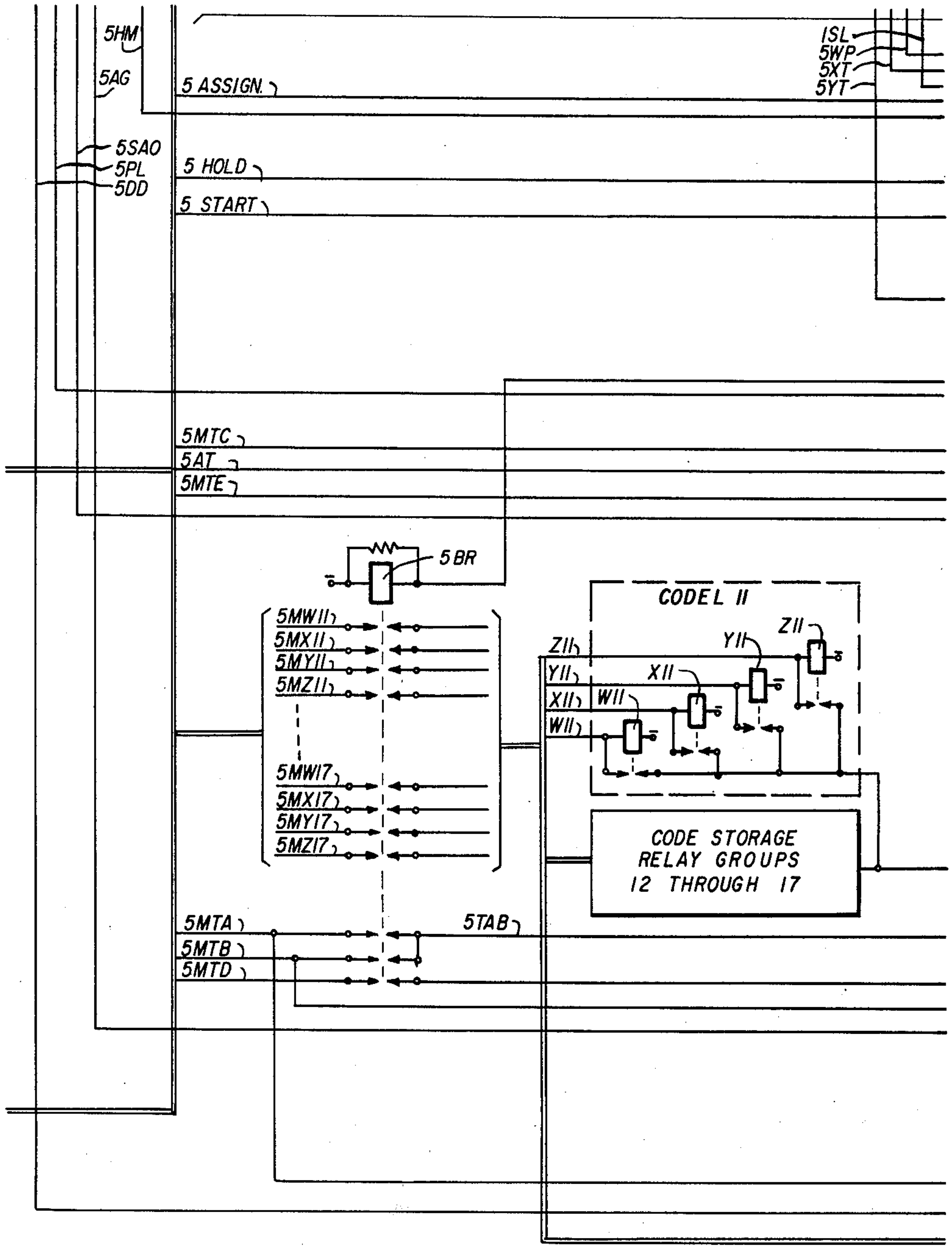
Figure 6:
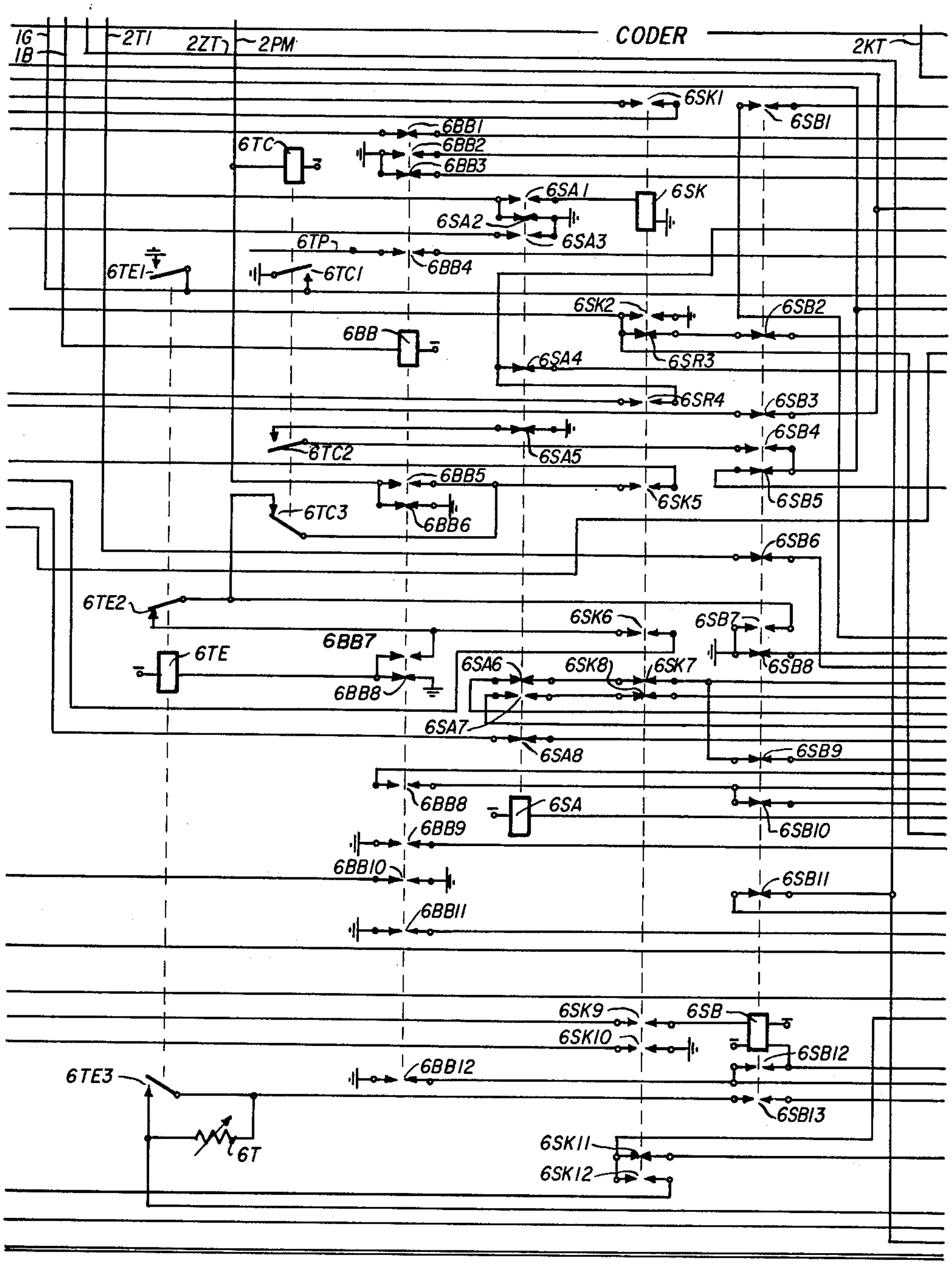
Figure 7:
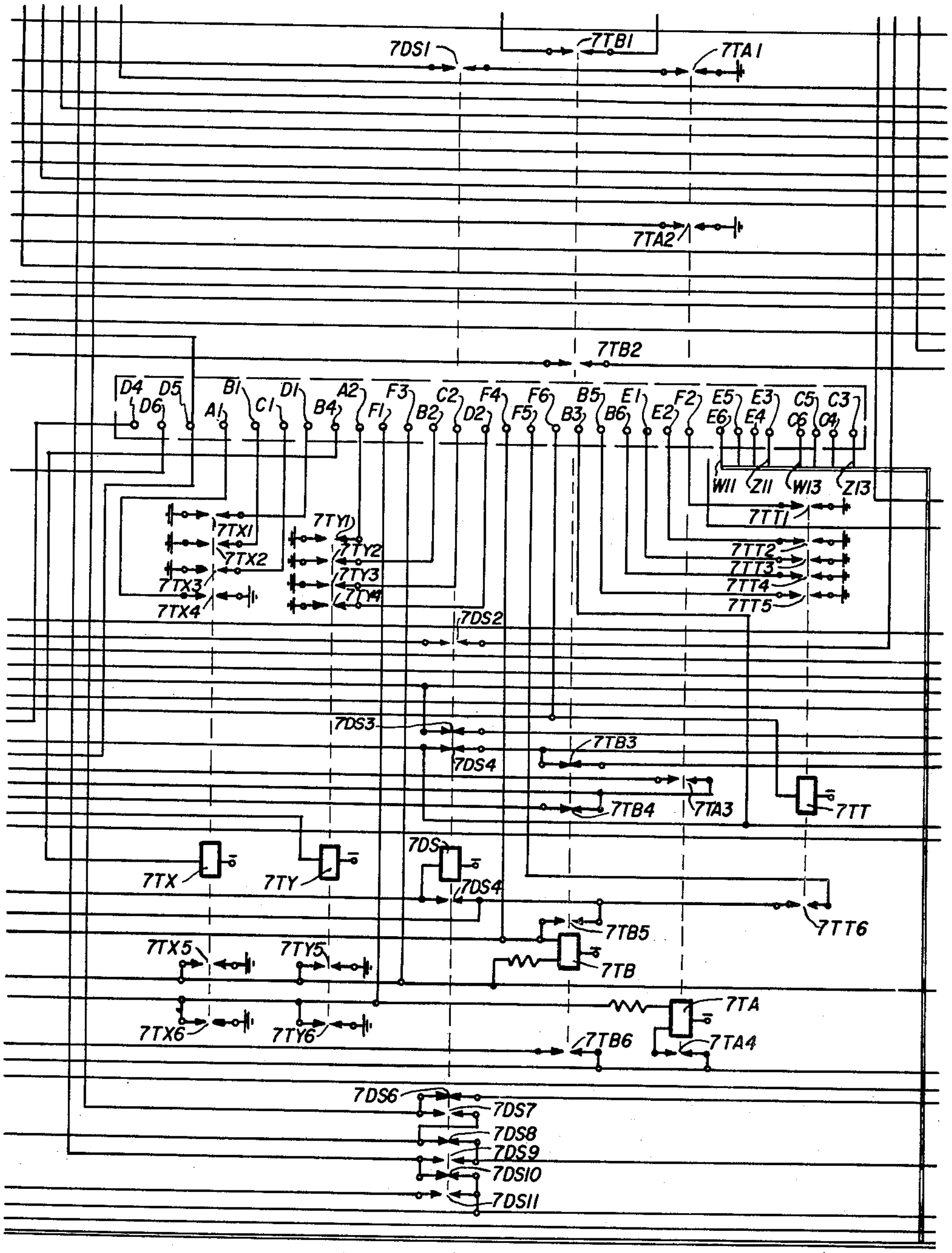
Figure 8:
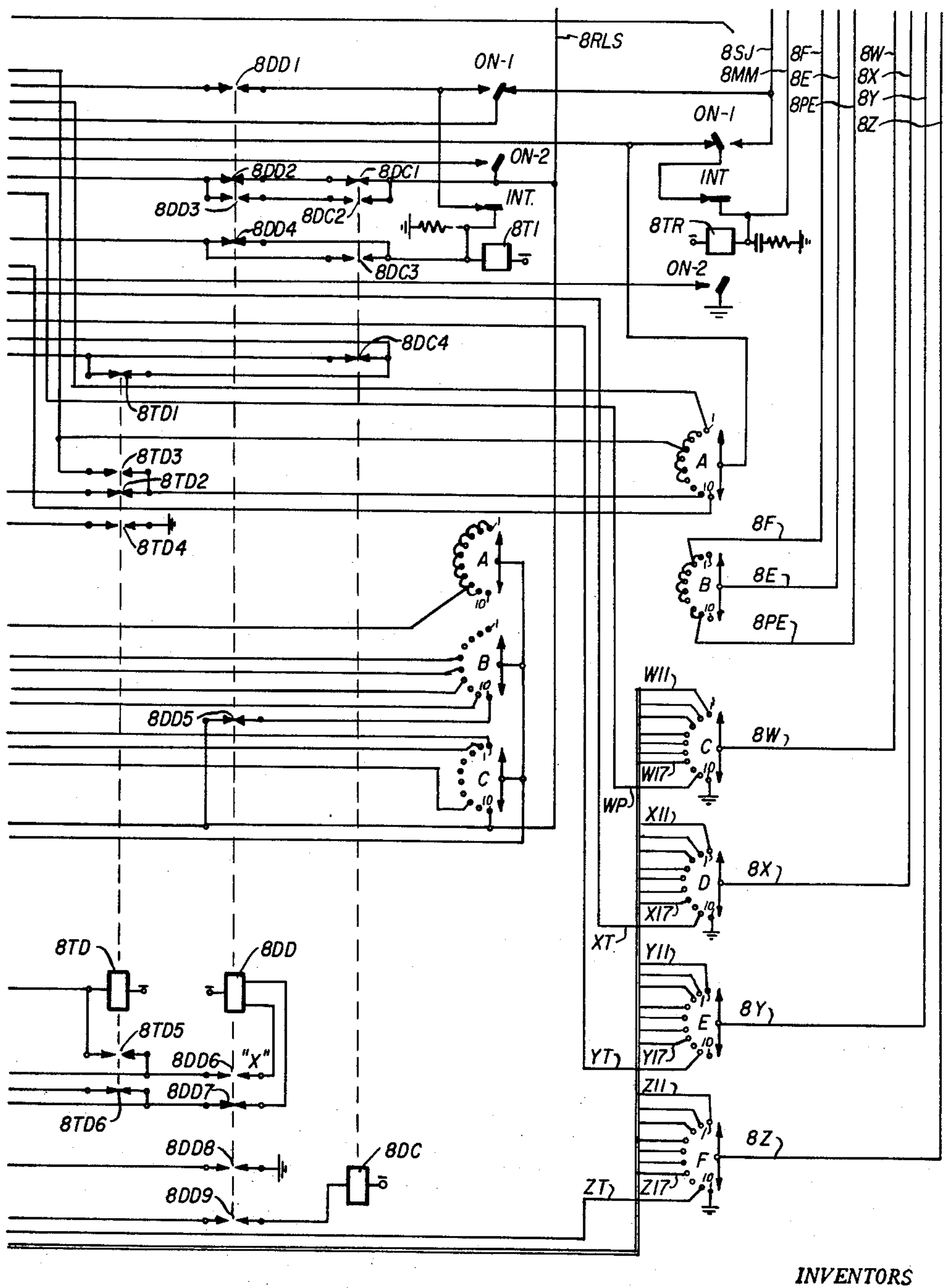

The present invention relates in general to automatic telephone systems and more particularly to improvements in automatic tool ticketing telephone systems arranged to automatically select a proper route for the extension of an outgoing call and supervise the process during the period of the extension of the call.

In prior automatic tool ticketing telephone networks of the type disclosed in the Ostline, Coleman and Taugner patent application, Serial No. 628,474, filed December 3, 1956, now U.S. Patent No. 3,019,295, toll ticketing telephone connections are established under the control of common equipment accessed by a code dialed into the local switch train by the calling subscriber. The common equipment usually includes a toll ticket repeater, a calling line directory number detector, a translator-sender circuit to insure that the digits are properly dialed into the succeeding exchange and a tabulator with its associated daters and ticket perforators to compile the data relating to the call and make a record of it. This type of ticketing equipment has met with great success. In the improved toll ticketing system described herein to further increase the economies and versatilities offered by systems of this general type, the previously enjoyed advantages of toll ticketing have been extended to exchanges in a network utilizing the present standard toll access number "112." This is performed by using an arrangement in the ticketer whereby the party identity is detected during the dialing of the called party number. In this connection reference is made to the copending application of Edward J. Glenner, Serial No. 70,526, filed November 21, 1960. This improved type ticketer, installed in an office, is used for the processing of subscriber dialed toll calls from that office as well as from stations served by the branch offices. This ticketer eliminates the need for the dialing of a special party identity digit following the toll access code. The elimination of the party identity digit deprives the ticketer of sufficient time to access an available translator-sender before the subscriber commences dialing the digits of the called number. The translator-sender cannot therefore immediately receive these digits as dialed by the subscriber. To overcome this difficulty, the ticketer stores the first digit, and while subsequent digits are being dialed directly to the translator-sender the first digit is removed from storage as a series of revertive pulses controlled mutually by the ticketer and transender. This aspect of the present disclosure has been claimed in the copending application of Ivan V. Coleman, Serial No. 73,749, filed December 5, 1960, now U.S. Patent No. 3,109,895.

The transender upon receiving the full complement of digits called for the services of a translator. Upon an operative connection with an available translator the three area digits are forwarded to the translator for conversion into the proper routing for extension of the call. However since this toll ticketing equipment is arranged to process outgoing toll calls from a plurality of originating exchanges, it is often desirable to restrict subscribers from certain of these exchanges from placing toll calls to areas or exchanges which they may reach via free service trunks. This restriction or discrimination imposes additional functions upon the translator to reroute or to inform the subscriber of the special conditions.

Accordingly, it is the main object of the present invention to provide in an improved automatic tool ticketing telephone system for use in such multi-exchange ticketing networks a translator capable of distinguishing the originating office and routing the call accordingly.

Another object is a translator and transender combination which controls the recording ticketer to mark the incoming trunk for the translator.

It is an ancillary object of the invention to provide new and improved circuits and apparatus for accomplishing the above operations.

It is a feature of this invention to provide in a telephone system an improved translator operable to provide a special translation upon receipt of a marking from a calling trunk.

Another feature of this invention is the circuitry of the translator whereby it will provide a conventional translation unless such marking is received.

Further objects and features of the present invention pertain to the particular arrangement of the various circuit elements of the automatic toll ticketing telephone system, whereby the above objects and additional operating features are obtained.

The invention both as to its organization and method of operation, together with further advantages thereof will best be understood by reference to the following specification taken in connection with the accompanying drawings, in which FIGURES 1–4, inclusive, illustrate in schematic form the details of the sender portion of the transender.

FIGURES 5–8, inclusive, illustrate in schematic form the details of the coder portion of the transender.

Figure 9:
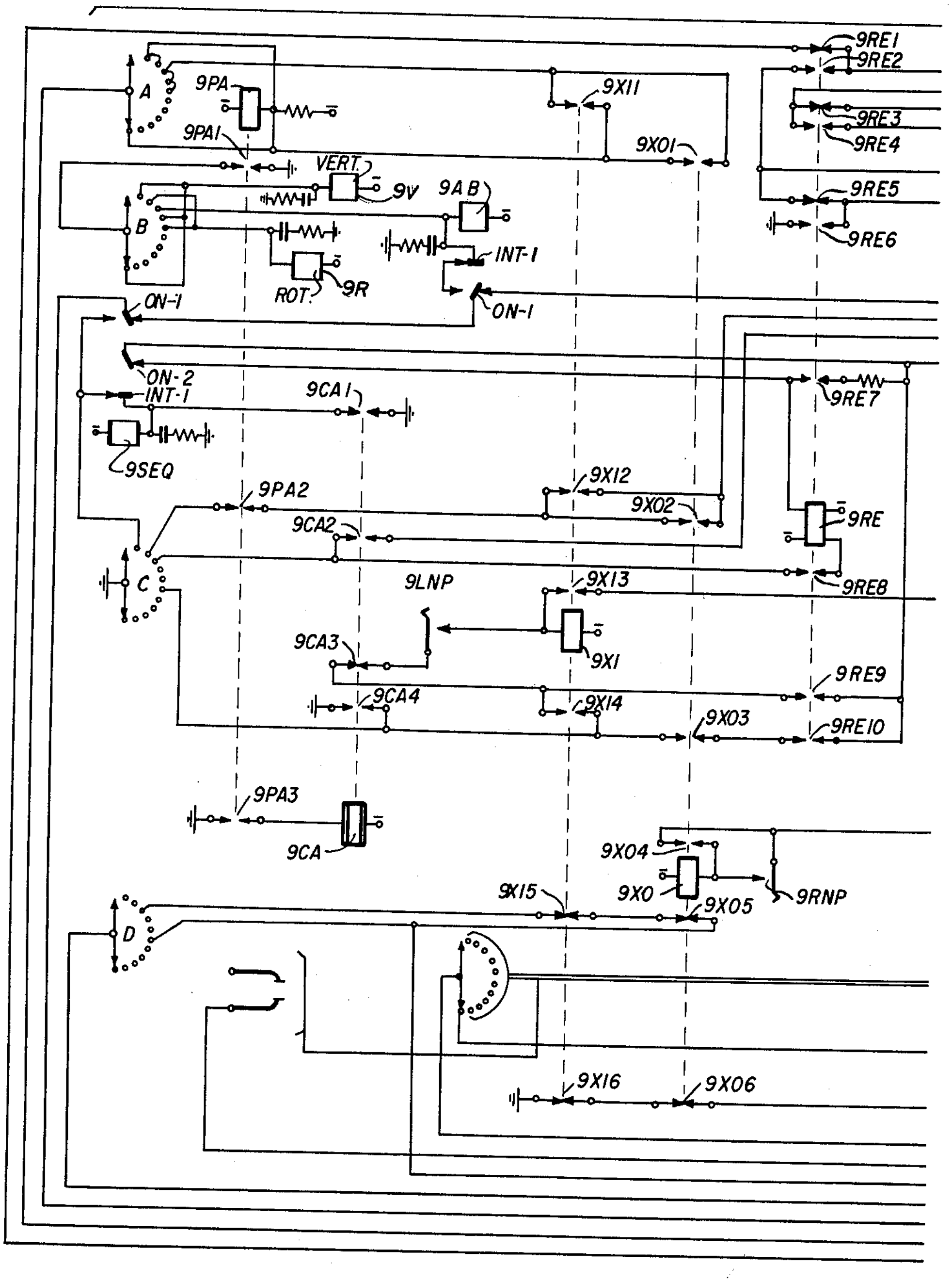
Figure 10:
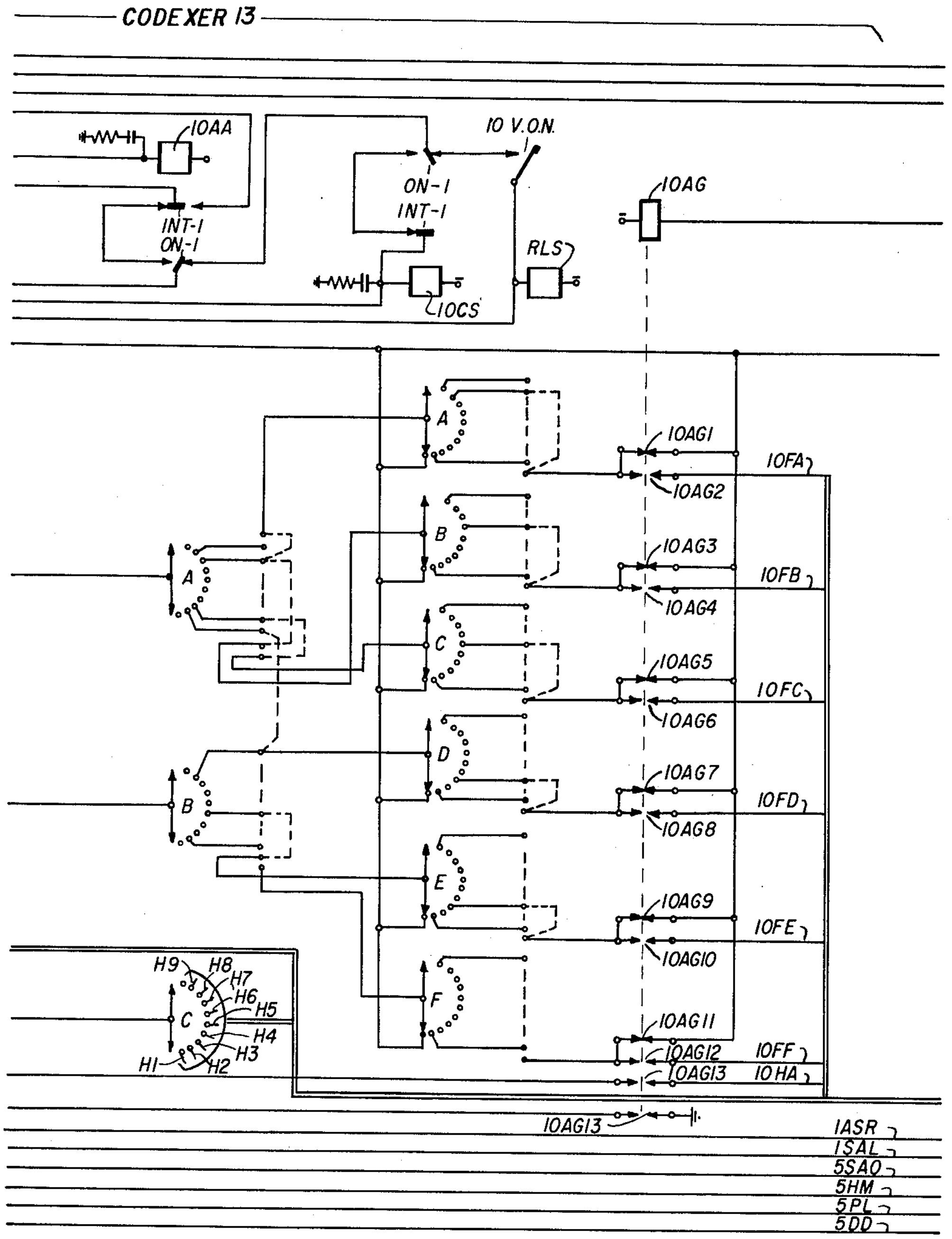

FIGURES 9 and 10 illustrate in schematic form the details of the codexer portion of the transender.

Figure 11:
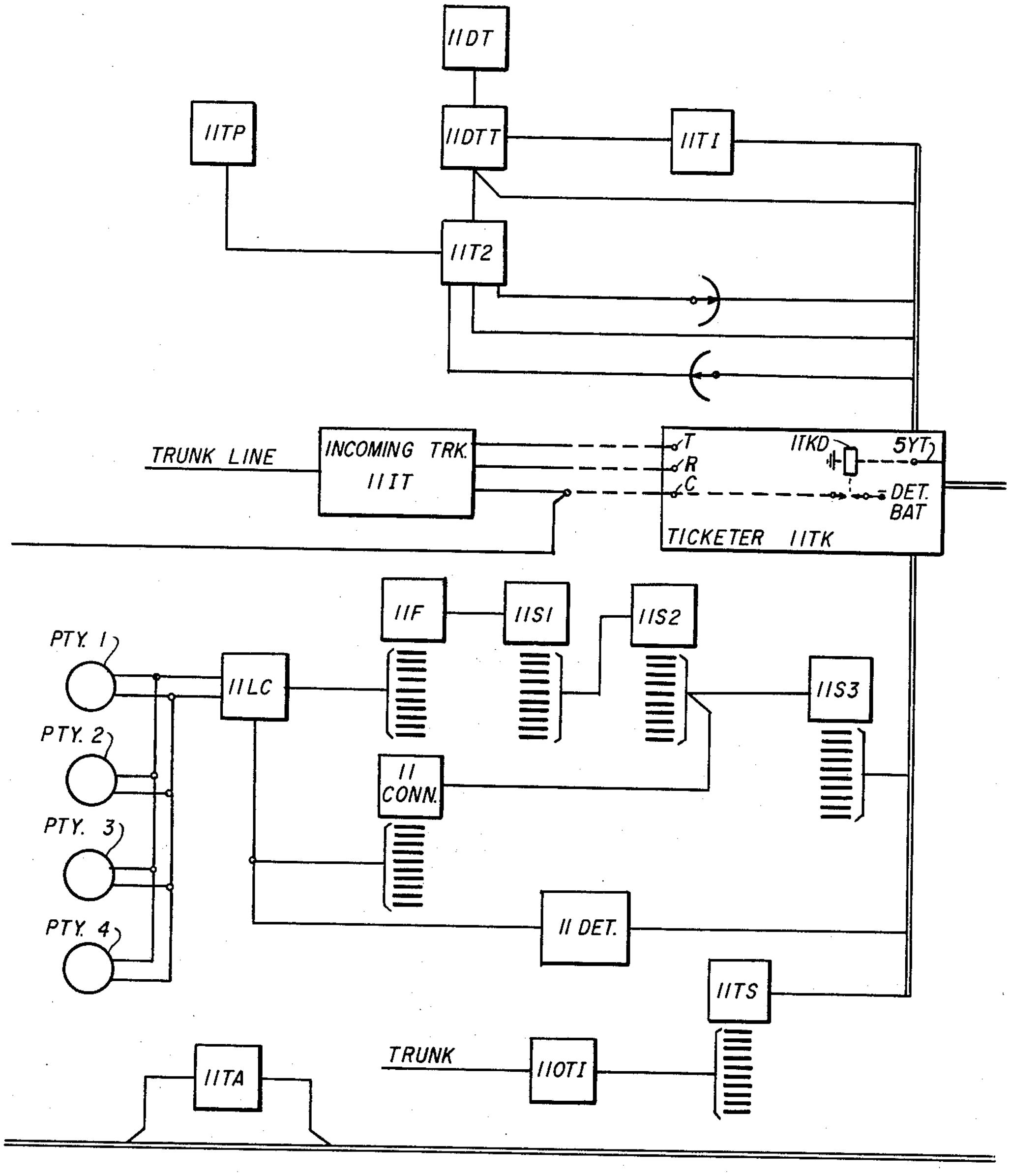

FIGURE 11 illustrates the details of the apparatus incorporated in the exchange. This equipment consists of the following equipment in schematic block diagram form, in the main exchange a subscriber line, a detector allotter, a detector 11DET, an outgoing trunk circuit 110T1, a ticketer selector 11TS for accessing the outgoing trunks, a tabulator 11T2, a dater timer transfer 11DTT, a dater timer 11DT, a pulse and time interrupter 11TI and a tape perforator 11TP. This in addition to the translator assigner 11TA. The ticketer has also shown an incoming trunk circuit 111T connected to it. The ticketer 11TK may be seized by the incoming trunk 11IT either directly as shown or through the medium of switching equipment. The functions of the switching equipment, line finders, and selectors is well-known and their operation will not be described in detail. The functions of the ticketer 11TK, translator 12TR, and the tabulator 11T2 with its associated equipment, will however be summarized for a clearer understanding of the invention. A detailed description of a ticketer for use with this invention will be found in the copending application of E. J. Glenner, filed November 21, 1960, Serial No. 70,526.

The principal functions of the Ticketer shown as box 11TK are as follows:

(1) Function common to all calls.

(*a*) It calls for a transender when seized.

(*b*) It repeats to the transender the Office code digits on seven or eight digit calls or the area code plus the office code digits (if needed) on ten or eleven digit calls.

(*c*) It absorbs those digits of the called number which are not required for sending.

(*d*) It provides for stop-dial and flashing signal supervision.

(*e*) After an adjustable "grace" period, it times the length of conversation from the time the called party answers until the calling party disconnects.

(*f*) It stores the following ticketing information during conversation: the calling number (7 digits); the called number (7, 8, 10, or 11 digits); and a change in toll rates indication, if it occurs during the call.

(*g*) After the calling party has disconnected, it calls for a Tabulator and transfers to it the ticketing information. During this transfer operation, the Ticketer is guarded against seizure from another call, but the calling line and the outgoing trunk are released. The Ticketer releases after transfer is completed.

(*h*) If the call is not answered, the Ticketer releases when the calling party disconnects and no ticketing information is recorded for the call.

(*i*) It provides special markings to the Transender when unstandard conditions are encountered.

(*j*) It provides visual supervision of the progress of a call through the Ticketer by means of the SUPY lamp.

(2) Functions of the Ticketer Pertaining to Local Access Calls.

(*a*) It tests for a low-resistance ground leak on the calling line.

(*b*) It determines the party identity and calls for a detection of the calling party's number.

(*c*) It stores the first dialed digit while hunting for a transender and after seizing a transender resends the first digit simultaneously with the repeating of the second and third digits to the transender.

(*d*) It provides for extending the call to a "D" operator should an incomplete detection occur.

(3) Functions of the Ticketer Pertaining to Remote Access Calls (Type "B" Service).

(*a*) It receives the calling party's number which has been detected in the branch office.

(*b*) It provides for extending the call to a "D" operator should an incomplete detection occur.

(*c*) It applies detector battery potential to the trunk "C" lead during the translation process.

(4) Functions of the Ticketer Pertaining to Remote Access Calls (Type "D" Service).

(*a*) It provides for extending the call to a "D" operator when the calling party has completed dialing the called number.

The translator 12TR is a group of relays which is used in conjunction with the transenders for the purpose of supplying the transenders with the necessary routing directive as determined by the first three or six digits registered in the transender on its codexer. The translator is common to the transender, it is seized only momentarily when a routing directive is required. The connection of the transender to the translator is controlled by the translator assigner.

The overall operation of the system whereby the primary object is attained involves the use of the ticketer, transender and tranlator. The ticketer upon access of a call from a branch exchange functions to apply an increased potential to the "C" lead of the incoming trunk after the transender signals the ticketer that the translation is to be initiated. This potential on the trunk "C" lead is wired to the translator. In the translator this increased potential serves to route the code lead from the transender via an alternate jumper field whereby it is routed to a different translator relay.

The tabulator 11T2 circuit's function is to forward toll call ticketing data to tape perforators. The toll call ticketing data consists of information received from the ticketer, the dater-timer, the radexer (if provided), and from the tabulator itself.

The information received from the ticketers consists of the ticketer identity number (three digits), conversation time (three digits), called number (seven, ten or eleven digits), calling number (five digits) and a possible change in rates during call conversation timing indication. The information received from the dater-timer consists of the calendar date (day and month), the time of day and a day or night rate indication. The dater-timer is directly connected to the tabulator via a dater-timer transfer circuit. The information connected directly within the tabulator is the tabulator identity (two digits) and the ABC office code (three digits) of the calling party.

The calling number received from the ticketer is composed of four terminal digits and an office code unit. The office code unit is a special marking to one of ten relays, each of which represents a separate office. Thus, the tabulator is capable of supplying a maximum of ten ABC office codes to the tape perforator.

The tabulator provides for access to as many as fifty ticketers. Under control of the tabulator allotter, it will hunt for and find a ticketer calling for a tabulator.

All data received from the ticketer is stored on relays in the tabulator prior to being forwarded to the tape perforator.

When the punched tape is processed for printing a ticket or punching a record card, the tape roll is removed and fed into other equipment in the reverse direction from that of the original punching.

In order that the ticket or punching card come out with a "straight" record of the call, all data is sent in reverse order from the ticketer to the tabulator and from the tabulator to the tape perforators. The tabulator is described in greater detail in the Ostline application Serial No. 625,773 filed December 3, 1956, now U.S. Patent No. 2,981,798.

Figure 12:
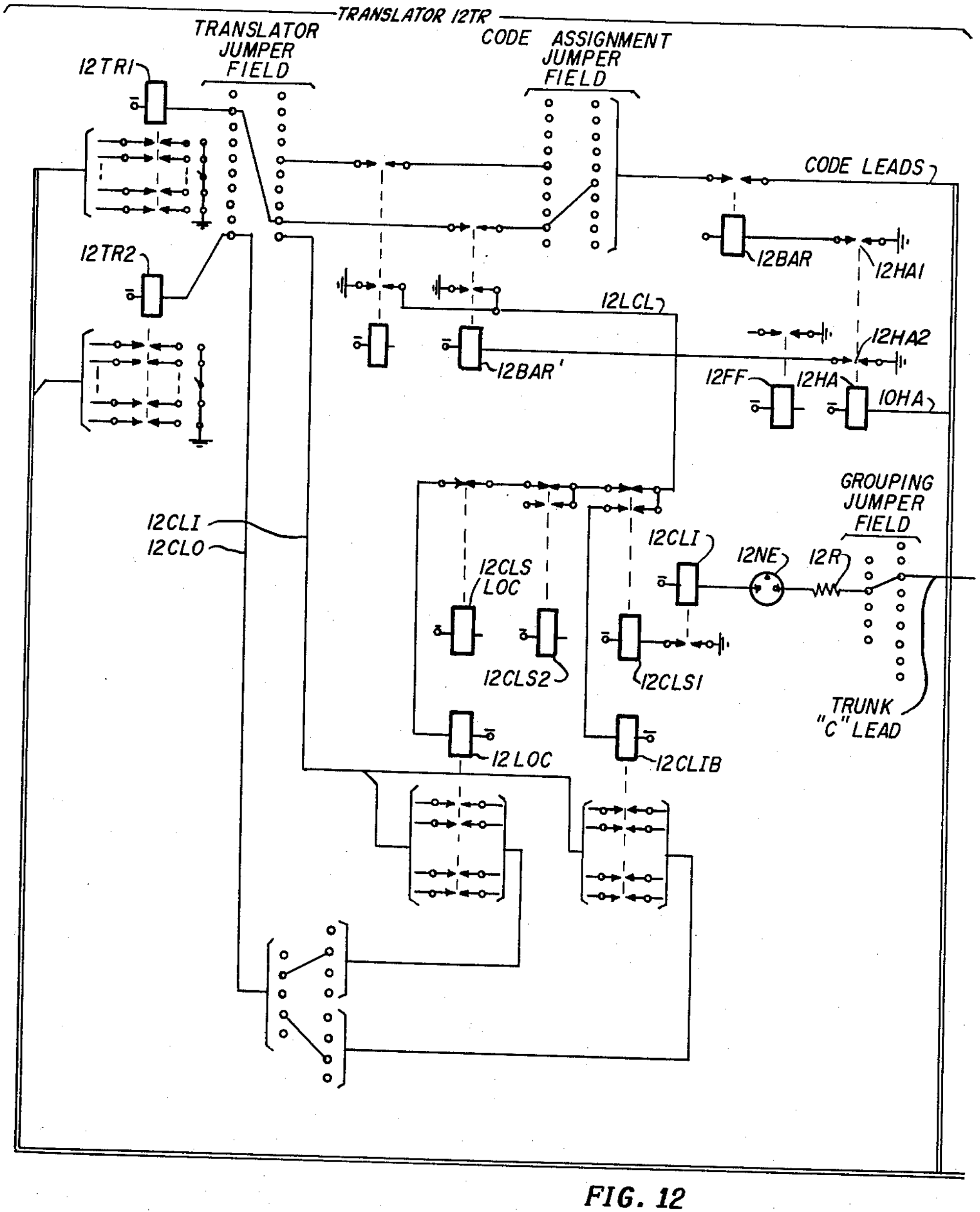

FIGURE 12 of the drawing discloses the circuit of the translator in simplified form with the connections necessary for disclosing the originating office check feature.

Figure 13:
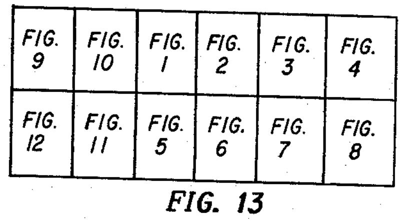

FIGURE 13 illustrates the manner of combining FIGURES 1–12 inclusive of the drawings to form a unified system.

DETAILED OPERATION

*Seizure From Local Selector-Local Access Calls*

When the calling subscriber at station 11PTY2 removes his receiver, the usual loop circuit, including the line conductors is completed for operating the line circuit 11LC. In response to the completion of the above mentioned loop circuit, the line circuit 11LC initiates operation of the distributor and marks the terminals of the calling subscriber line in the bank contacts of a group of line finders, including the line finder 11F, having access to the calling subscriber line. For the purpose of this description it will be assumed that the distributor selects the line finder 11F and that the latter finder operates its wipers in a vertical and then in a rotary direction in the well-known manner to select the terminals in the associated bank terminating to the calling line. When the calling line is found by the line finder 11F, it extends the calling line to the individually associated first selector 11S1 and the latter selector transmits the usual dial tone signal to the calling subscriber to indicate that the dialing may be started. The above noted switching apparatus, including the line circuit 11LC, the distributor, the line finder 11F and the first selector 11S1 may be of conventional construction and arrangement and may be, for example, of the type illustrated in the Bakker Patent No. 2,289,896, granted July 14, 1942 and in the Saunders Patent No. 1,849,694, granted March 15, 1932.

Since the calling subscriber at station 11PTY2 intends to extend the connection to a called subscriber in a remote exchange it is necessary to prefix the directory number of the called subscriber with the access code digits "112." Consequently, when the calling subscriber received the dialing tone signal the dial is actuated in accordance with the digit to transmit one loop impulse to the first selector 11S1. This selector then raises its wipers in a vertical direction to the first level and then rotates its wipers over this selected level to search for a succeeding selector 11S2 and through 11S2 and 11S3 in the same manner to an idle ticketer, such as the ticketer 11TK. It will be assumed for the purpose of this description that the selectors now extend the connection from the calling subscriber line by way of the cable to the ticketer. The cable includes the "−" conductors, the "+" conductor and the control conductor. If the ticketer is busy, the control conductor will be grounded in order to indicate the busy condition to the selectors. Thus, as the selector rotates its wipers over the level it will pass over contacts terminating ticketers having grounded control conductors.

When the selector wipers come to rest upon contacts not having a grounded control conductor the ticketer is seized and will accept the digits as dialed by the calling subscriber. These digits are comprised of the office code and the terminal numbers, and if the call is to a foreign area the above digits will be preceded by a three digit area code. The ticketer accepts these digits and stores them. During the dialing by the calling subscriber of the first digit the ticketer initiates a hunt for a free transender unit. The second and subsequent digits are repeated to the transender as dialed. The first stored digit is then sent to the transender revertively during the interval of the dialing of the second and third digits. When the ticketer is seized by an incoming trunk all of the operations are the same as described except that the transender during its connection with the translator conditions the ticketer to apply an increased potential to the incoming trunk "C" conductor.

Upon completion of the operations involving the transender the ticketer then functions to complete and monitor the call.

OPERATION OF CODER (12)

*Seizure.*—(Operated: Relays 6TE and 6TC.) Absence of ground on lead 1G marks this circuit idle to the Transender Hunter associated with the preceding equipment (Ticketer).

When seized, the circuit is closed to relay 6BB via lead 1B from the associated Sender. Relay 6BB operates, closes ground to switch 8TR, closes lead 6TP (Time Pulse) to switch 8T1, opens the circuits to relays 6TE and 6TC, prepares a circuit to relay 6SA, closes ground to levels A, B, and C wipers of switch 8T1, and prepares the holding circuit to the codel storage relays. Relay 6TC restores and closes ground to lead 1G. Relay 6TE restores, closes a multiple ground to lead 1G, and short circuits the thermistor 6T. Switch 8TR operates and opens its INT springs. The INT springs open the circuit of switch 8TR. Switch 8TR restores, closes its INT springs, and advances its wiper one step which closes ground to lead 7RSH via its level A wiper. On the first rotary step its R.S.O.N. springs operate, close switch 8TR to lead 8SJ, and close a multiple ground to lead 1G. Pulses, via lead 6TP, are provided at 10 or 15 pulses per minute with the rate automatically selected in accordance with the loading of the Transender group, closing ground to switch 8T1 via the 6TP lead. The operation of timing switch 8T1 is explained in a subsequent section.

*Type "ANI" Call*

*Calling for a Translator.*—(Operated: Relay 6BB and switches 8TR.) After the associated Codexer 13 has received the area and/or "ABC" office code and the associated Sender 11 has received a complete detection indication from the Ticketer, ground is closed from the Sender 11 via lead 1SAL, level D of switch 9SEQ in the associated Codexer 13, lead 5SAO, to relay 6SA. Relay 6SA operates transfers lead 5HOLD from direct ground to resistance ground (relay 6SK), grounds lead 5START to indicate to the translator Assigner that a translation is required, and opens lead 5AT.

*Translation.*—(Operated: Relays 6BB and 6SA, and switches 8T1, and 8TR.) As the Translator Assigner hunts for the calling Coder, resistance ground on lead 5HOLD indicates to the Translator Assigner that this circuit requests a translation. When the Translator Assigner steps to this circuit, low resistance battery is closed via lead 5HOLD to relay 6SK.

Relay 6SK operates, closes lead 5ASSIGN to lead 1SL, grounds lead 5YT to operate relay 11KD of the ticketer to indicate that translation is in progress, closes leads 5MTC and 5MTE to relays 6TC and 6TE respectively, grounds lead 5AG, and closes relay 7TA to lead 5MTA.

*Start of Sending*

*Immediate Sending.*—(Operated: Relays 6BB, 6SA, and 6SK, and switches 8T1 and 8TR.) For immediate sending the directive from the translator includes a ground mark on lead 5MTA. Relay 7TA operates through its first winding via ground on lead 5MTA, locks through its second winding, and closes a circuit to relay 5BR. Bar relay 5BR operates and extends leads 5MW11 through 5MTD. Subsequent action in the Codexer 13 and Sender 11 causes the Translator 12TR to operate and close grounds representing the sending control digit and a directive of one to six digits to code storage relay groups marked CODELS 11 through 17. The various code storage relays operate, lock, and close ground to the bank terminals of switch 8TR.

The ground mark on lead 5MTA is also closed to leads 5MTB and 5TAB when bar relay 5BR operates. Ground via lead 5MTB closes a circuit to relay 6SB which operates, locks, removes lead 2ZT from relay 7DS, and opens leads 2T1, 5PL, and 5WP. Ground via lead 5TAB closes a circuit to relay 7TB which operates, locks, closes leads 24 VAC and MOT, and opens the circuit to relay 6SA. Relay 6SA restores, transfers ground from lead 5START to lead 5HOLD, closes lead AT, grounds leads 3SB and 5XT, and opens the circuit to relay 6SK. Ground on lead 5XT indicates to the Ticketer that 6-digit or 9-digit called numbers are insufficient. Relay 6SK restores, opens the circuits to the first windings of relays 7TA and 6SB, removes ground from leads 5AG and 5YT, opens the circuit to relay 5BR, opens lead 5ASSIGN from lead 1SL, and removes leads 5MTE and 5MTC from relays 6TE and 6TC respectively. Relay 5BR restores, opens leads 5MW11 through 5MTD.

If the Coder received a ground mark on lead 5MTC from the Translator 12TR during translation, relay 6TC will have operated (before relay 6SK restored), and ground will not be closed to lead 5XT when relay 6SA restores. This indicates to the Ticketer that 6-digit or 9-digit called numbers are insufficient.

*Delayed Sending.*—(Operated: Relays 6BB, 6SA, and 6SK and switches 8T1 and 8TR.) If sending must be delayed, the directive will include a ground mark on lead 5MTB instead of on lead 5MTA. Relay 6SB operates through its first winding via ground on lead 5MTB, locks through its second winding, removes lead 2ZT from relay 7DS, opens the circuit of relay 6SA, and opens lead 2T1, 5PL, and 5WP. Relay 6SA restores, closes ground to lead 5HOLD, removes ground from lead 5START, closes lead 5AT, and opens the circuit of relay 6SK. Relay 6SK restores, prepares a circuit to the first winding of relay 7TA, removes ground from leads 5AG and 5YT, removes leads 5MTE and 5MTC from relays 6TE and 6TC, and opens the circuit to the first winding of relay 6SB.

At the completion of dialing, ground is closed to the second winding of relay 8DD via leads 5DD, 3CM, and 3CA. Relay 8DD operates "X" contacts 8DD6, locks on its second winding, closes a circuit to relay 8DC to ground via lead 5DD, removes switch 8T1 from the time pulsing circuit, closes switch 8T1 to ground via its level A wiper, opens lead 7FB, and closes a circuit to relay 7TA. Switch 8T1 operates and steps its wipers self-interruptedly. Relay 8DC operates, recloses switch 8T1 to the pulsing circuit, and recloses lead 7FB. Relay 7TA operates, locks and closes a circuit to relay 6SA. Relay 6SA operates, closes lead 5HOLD to relay 6SK, and grounds lead 5START. The Coder 12 is now ready for re-translation.

When the Translator Assigner again steps to this circuit, resistance battery is closed to relay 6SK, and translation continues as explained in the preceding section.

Note.—If conditions for re-translation are satisfied prior to assignment for initial translation, the re-translation cycle will be by-passed. Ground via lead 5DD closes relay 8DD which operates and closes a circuit to relays 8DC and 7TA. The circuit continues to operate as previously described.

*Sending.*—(Operated: Relays 6BB, 7TA, 7TB, 6SB, possibly 6TC, switches 8T1 and 8TR.) When ground is closed to lead 3SB, relay 2SB of the Sender 11 operates. Various relays in the Sender operate to start the sending of the sending control digit stored on relay storage group marked CODEL 11 and appearing on bank position 1 of switch 8TR. They also close the circuit to switch 8TR via lead 8MM. Any one or two relays (W11, X11, Y11, or Z11) operated, will close ground through leads W11, X11, Y11, or Z11, levels C, D, E, or F of switch 8TR, leads 8W, 8X, 8Y, or 8Z to levels A and B of switch 4S1 of the Sender 11 to mark the sending control digit.

Switch 4S1 scans and, when both wipers are simultaneously connected to ground, relay 4PC of the Sender operates, closes a circuit to relay 2PB which stops sending and opens the circuit of switch 8TR. Switch 8TR restores and advances its wipers one step, connecting the first digit of the routing directive through levels C, D, E, and F of switch 8TR to the Sender through leads 8W, 8X, 8Y, and 8Z. Ground from the Sender again closes the circuit to switch 8TR. Switch 4S1 starts scanning again and, when both wipers are simultaneously connected to ground, relay 4PC operates, closes a circuit to relay 2PB which stops sending and opens the circuit to switch 8TR. Switch 8TR restores and advances its wipers one step. Subsequent digits stored are sent in the same manner as explained above.

*Release.*—(Operated: Relays 6BB, 7TA, 7TB, 6SB, various codel relays, and possibly 8DD, 8DC, and 6TC, and switches 8TR and 8T1.) When the Transender Sender 11 releases, it removes ground from lead 1B to open the circuit of relay 6BB. Relay 6BB restores, opens the circuits of relays 8DD, 7TB, the operated codel relays, closes a circuit to relay 6TE, closes a circuit to relay 6TC (if not already operated), closes lead 5HM to switch 8TR via its INT and R.S.O.N. springs, and removes lead 6TP from switch 8T1.

Relay 7TB restores, opens leads 24 VAC and MOT, removes ground from lead 3SB, and opens the circuit to relay 6SB. Relay 8DD restores, and opens the circuits of relays 8DC and 7TA. The operated codel relays restore. Relays 6SB and 8DC restore. Relay 7TA restores and opens lead 2KT. Relay 6TE operates and removes a multiple ground from lead 1G. Relay 6TC operates (if not already operated) and removes a multiple ground from lead 1G.

After the Sender 11 has released completely, ground is closed to lead 5HM to close the "homing" circuit to switch 8T1. Switch 8T1 operates and "homes" to normal. When at normal, its R.S.O.N. springs restore and close the "homing" circuit to switch 8TR. Switch 8TR "homes", and when at normal restores its R.S.O.N. springs. The R.S.O.N. springs open its "homing" circuit and remove ground from lead 1G. The circuit is now at normal.

*Checking Operator Type Call*

*Calling for a Translator.*—(Operated: Relay 6BB and switches 8T1 and 8TR.) The Ticketer closes ground via the Transender Hunter and lead 2ZT to relay 7DS. Relay 7DS operates, locks, grounds lead 3SAK, and closes lead 3CA to relay 7TA.

After the associated Codexer 13 has received the area and/or "ABC" office code, ground on lead 1SAL is closed through level D of switch 9SEQ in the Codexer 13, lead 5SAO, to relay 6SA. Relay 6SA operates, transfers lead 5HOLD from ground to relay 6SK, closes ground to lead 5START to indicate to the Translator Assigner that a translation is required and opens lead 5AT.

*Translation.*—(Operated: Relays 6BB, 6SA, 7DS, and switches 8T1 and 8TR.) Translation is the same as explained earlier.

*Start of Sending*

*Immediate Sending.*—(Operated: Relays 6BB, 6SA, 6SK, 7DS, and switches 8T1 and 8TR.) Immediate sending is the same as explained in an earlier section, except for the following. When relay 7TA operates, ground is closed to lead 2KT (since, relay 7DS is operated). Ground on lead 2KT indicates to the Ticketer that sending is to start.

Ground via lead 5DD closes a circuit to relay 8DD. Relay 8DD operates its "X" contacts 8DD6 locks, removes its second winding from lead 5DD, closes the circuit of relay 8DC to ground via lead 5DD, removes switch 8T1 from the time pulsing circuit closes switch 8T1 to ground via its level A wiper, and opens lead 7FB. Switch 8T1 operates and steps its wipers self-interruptedly. Relay 8DC operates, recloses switch 8T1 to the pulsing circuit, and recloses lead 7FB.

When the minimum required number of digits have been dialed (6 or 9 if the Coder 12 received a ground mark on lead 5MTC, otherwise 7 or 10 digits), the Ticketer prepares to call in a checking operator. This is indicated by resistance battery (relay 8DC) on Coder 12 lead 5DD.

When the checking operator enters the call, resistance battery is closed to lead 5DD which shunts relay 8DC. Relay 8DC restores, opens lead 7FB, and opens switch 8T1 to stop its timng action. After the calling party's number is keyed in, the checking operator leaves the call and the resistance battery is removed from lead 5DD. Relay 8DC reoperates, closes lead 7FB, and closes switch 8T1.

*Delayed Sending.*—(Operated: Relays 6BB, 7DS, 6SA, and 6SK and switches 8T1 and 8TR.) If sending must be delayed, the directive will include a ground mark on lead 5MTB instead of a ground mark on lead 5MTA. Relay 6SB operates through its first winding via ground on lead 5MTB, locks through its second winding, removes lead 2ZT from relay 7DS, opens the circuit of relay 6SA, and opens lead 2T1, 5PL, and 5WP. Relay 6SA restores, closes ground to lead 5HOLD, removes ground from lead 5START, closes lead 5AT, and opens the circuit of relay 6SK. Relay 6SK restores, prepares a circuit to the first winding of relay 7TA, removes ground from leads 5AG and 5YT, and removes leads 5MTE and 5MTC from relays 6TE and 6TC opens the first winding of relay 6SB.

At the completion of dialing, ground is closed to the second winding of relay 8DD via lead 5DD. Relay 8DD operates its "X" contact 8DD6, locks removes its second winding from lead 5DD, closes the circuit of relay 8DC to ground via lead 5DD, removes switch 8T1 from the time pulsing circuit, closes switch 8T1 to ground via its level A wiper, and closes lead 7FB. Switch 8T1 operates and steps its wipers self-interruptedly. Relay 8DC operates recloses switch 8T1 to the pulsing circuit, and recloses lead 7FB.

When the required number of digits have been dialed, the Ticketer calls in the checking operator. Response of the checking operator closes various relays in the Ticketer and Sender 11. Sender 11 relay 3CT operates and closes a circuit between leads 3CA and 3CM which closes a circuit to relay 7TA. Relay 7TA operates, locks, closes a circuit to relay 6SA, and grounds lead 2KT. Relay 6SA reoperates, closes lead 5HOLD to relay 6SK, and grounds lead 5START. The Coder 12 is now ready for retranslation. When the Translator Assigner again steps to this circuit, resistance battery is closed to relay 6SK, and translation continues as explained in an earlier section. The checking operator, who entered the call, closes resistance battery to lead 5DD which shunts relay 8DC. Relay 8DC restores, opens lead 7FB, and opens switch 8T1 to stop its timing action. After the calling party's number is keyed in, the checking operator leaves the call and the resistance battery is removed from lead 5DD. Relay 8DC reoperates, closes lead 7FB, and closes the circuit to switch 8T1.

*Special Directives*

If the Coder 12 receives a ground mark on lead 5MTD, ground is closed to relay 8TD. Relay 8TD operates, locks, and opens the operating circuit to relay 8DD. Relays 8DD and 8DC will not operate and resistance battery (relay 8DC) will be completely withheld from lead 5DD. The checking operator will thus be by-passed when routing "non-dialable," blocked, and unassigned codes or when routing to recorded message, tone, or intercept termination on the basis of the finding that no trunks are available on the initial translation.

If the Coder receives a ground mark on lead 5MTE ground is closed to relay 6TE. Relay 6TE operates, locks, removes multiple ground from lead 1G, and removes a short circuit from THERMISTOR 6T. At the completion of dialing, ground is closed to relay 8DD through the THERMISTOR 6T via lead 5DD. After a time delay, relay 8DD operates as previously described. The ground mark on lead 5MTE is used in mixed numbering systems when extra-pull calls are comparatively numerous.

*Sending*.—(Operated: Relays 6BB, 7TA, 7TB, 6SB, 7DS, 8DD, 8DC, possibly 8TD, 6TE, and 6TC, and switches 8T1 and 8TR.) Sending is the same as explained in an earlier section, with the following exception.

If all digits of the called number are to be deleted (indicated by ground on lead 5MTD during translation), switch 8TR steps self-interrupted from bank terminal 9 to 10 because of the operation of relay 8TD on translation. The reading leads 8W, 8X, 8Y, and 8Z are, therefore, not extended to the Ticketer in this case; instead a blanked pulse sending cycle occurs on bank terminal 10 to cause the Ticketer to cut-through and release the Transender. Lead 7RSO is also grounded on this step of switch 8TR.

At this point the Sender 11 goes through the motion of sending code WXZ and sends a sequencing pulse to the Ticketer which in turn switches through and effects release.

*Release*.—(Operated: Relays 6BB, 7TA, 7TB, 6SB, 8DD, 8DC, 7DS, various codel relays, and possibly 6TE, 6TC, 8TD, and switches 8TR and 8T1.) When the Transender Sender 11 releases, it removes ground from lead 1B to open the circuit to relay 6BB. Relay 6BB restores, opens the circuits to relays 7TA, 7TB, 8DD, 7DS, 8TD, (if operated), the operated codel relays, closes 6TE and 6TC (if not already operated), closes lead 5HM to switch 8TR via its INT and R.S.O.N. springs, and removes lead 6TP from switch 8T1. Relay 7TB restores, opens leads 24 VAC and MOT, removes ground from lead 3SB, and opens the circuit to relay 6SB. Relay 8DD restores and opens the circuit of relay 8DC. The operated codel relays restore. Relays 6SB, 8DC, 7DS, and 7TA restore. Relay 8TD restores. Relays 6TC and 6TE operate (if not already operated) and remove multiple ground from lead 1G.

After the Sender 11 has released completely, ground is closed to lead 5HM to close the "homing" circuit to switch 8T1. Switch 8T1 operates and "homes" to normal.

When at normal, its R.S.O.N. springs restore and close the "homing" circuit to switch 8TR "homes," and when at normal restores its R.S.O.N. springs. The R.S.O.N. springs open its "homing" circuit and remove ground from Lead 1G. The circuit is now at normal.

*Call Progress Timing*

Switch 8T1 supervises the subscribers dialing and various functions of the Ticketer and Transender by providing time check points on its bank contacts as follows.

| Checkpoint: | Switch 8T1 bank position |
|---|---|
| (*a*) Detection completed or checking operator call indication received | Level B, contact #5. |
| (*b*) Dialing of code completed (six digits if dual translated) | Level B, contact #6. |
| (*c*) Stuck Translator Assigner Check, first translation | Level B, contact #8. |
| (*d*) First translation complete | Level B, contact #9. |
| (*e*) Dialing of called number completed. At this point timing switch 8T1 is reset to a new starting point | Level B. |
| (*f*) Stuck Assigner check for retranslation, automatic number identification calls only | Level C, contact #1. |
| (*g*) All translation complete, automatic number identification calls only | Level C, contact #2. |
| (*h*) Sending complete on automatic number identification calls | Level C, contact #7. |
| (*i*) Sending complete on checking operator calls | Level C, contact #10. |

Switch 8T1 follows the ground pulses via lead 6TP and steps its wipers every 4 to 6 seconds. On a normal call, the timing switch lags the call progress, therefore it must be reset (see (*e*) above). When relay 8DD operates, ground is closed to switch 8T1 via its level A wipers. Switch 8T1 steps self-interruptedly to bank contact number 10 and restores. The operation of relay 8DC recloses switch 8T1 to the time pulsing circuit. Its level C wipers are now positioned to continue the checking, i.e., checkpoint (*f*). When the call is completed switch 8T1 "homes" to normal via lead 5HM.

*Optional Wiring*

This circuit is arranged to provide optional translations which are set up by strap wiring for special routing digits. The desired digits are to be strapped in accordance with the following code.

| Digit: | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

The built in translations provided are "TX," "TY," and "TT."

*"TX" Translation*.—(Operated: Relay 6BB and switches 8T1 and 8TR.) When the subscriber fails to dial digit "0," if required by the Ticketer, ground is closed to lead 5XT which closes the circuit to 7TX, strap B4 to D6. For busy tone without routing: strap B1 to B3.

For special routing (omitting B1–B3 strap) strap A1 and/or B1 individually to required terminals of group C3–C6 if second routing digit is needed.

*To Provide Special Routing Directive*

Relay 7TX operates, closes circuits to the first winding of relay 7TB, 8TD, the first winding of relay 7TA, and closes the operating circuits to code storage relay groups marked Codel 12 and possibly, Codel 13 (depending on the strapping). The appropriate storage relays operate, lock, and close ground to the associated bank terminals of switch 8TR. Relay 8TD operates, locks, closes circuit to the storage relay Z11, and connects terminal 9 of level A switch 8TR to lead 3SK. Code storage relay Z11 operates, relay 7TA operates and locks through its second winding. Relay 7TB operates, locks through its second winding, closes a circuit to the second winding of relay 6SB, and closes lead 3SB to operate relay 2SB in the Sender circuit 11 which starts the sending operations. Relay 6SB of the Coder operates, locks, and opens the circuit of relay 7TX. Relay 7TX restores and removes multiple ground from relays 8TD, 7TA, the first winding of relay 7TB, and operated Codel relays W12–Z12, and W13–Z13.

When the sending cycle begins, ground closed to lead 8MM closes a circuit to switch 8TR. Switch 8TR operates. Relay Z11 of Codel 11 is at the present connected through level F of switch 8TR and lead 8Z to switch 4S1 of the Sender circuit 11. The operations of the control digit are the same as explained in the preceding section.

When the sending cycle is completed, ground is removed from lead 8MM to open switch 8TR. Switch 8TR restores and advances its wipers to bank terminal 2 associated with storage group CODEL 12, which stores the marking for the first digit of the special routing directive. Ground on lead 8MM again operates switch 8TR. After the sending cycle is completed, ground is removed from lead 8MM to open switch 8TR. Switch 8TR restores and advances its wipers to bank terminal 3 associated with storage group CODEL 13. The second digit (when provided) is sent in the same manner as explained above.

At the end of the first or second digit, the circuit is closed to switch 8TR from ground through its level A wiper, lead 3SK, through the Sender circuit 11, lead 4SJ, and its R.S.O.N and INT springs. Switch 8TR steps its wipers self interrupted to bank terminal 10 which closes the circuit to relay 2RS of the Sender circuit. In addition, ground is closed to leads 8W, 8X, and 8Z through bank terminal 10. Switch 4S1 of the Sender circuit starts operating and, when wipers A and B of switch 4S1 are connected simultaneously to ground, relay 4PC operates and sends a ground pulse via lead 1PT to a switch of the Ticketer to cause the Ticketer to switch through and free the Transender.

*To Provide Busy Tone to the Calling Party*

If in this condition it is desired to close busy tone to the calling party instead of a special routing, the following action will take place. Relays 7TX, 7TA, 7TB, and 6SB operate as explained in the preceding Section with the following exception. Ground is closed to leads 8RLS and 7FB via terminals 7B1 and 7B3, instead of the codel relays, when relay 7TX operates. This ground closes the circuit to relay 1TS of the Sender 11. Relays 1TS operates and opens the circuit of Sender relay 1BB from lead 1HT. This action of the Transender, in initiating its own release, causes the Ticketer to extend busy tone to the calling party.

*Release.*—(Operated: Relays 6BB, 7TA, 7TB, 8TD, 6SB, and various operated codels, and switches 8T1 and 8TR.) When sender relay 1BB restores, it removes ground from lead 1B which opens the circuit of relay 6BB in this circuit. Relay 6BB restores, opens the circuits of relays 7TA, 7TB, 8TD, 6SD, removes lead 6TP from 8T1, opens the operated codel relays, closes lead 5HM to switch 8T1 via its INT and R.S.O.N. springs, and closes a circuit for relay 6TE and 6TC. The codel relays restore. Relay 7TA restores and removes ground from lead 3SB. Relay 7TB restores and opens lead 24VAC and MOT. Relays 6SB and 8TB restore. Relays 6TC and 6TE operate and remove multiple ground from lead 1G.

After the Sender 11 has released completely, ground is closed to lead 5HM which closes the "homing" circuit to switch 8T1. Switch 8T1 operates and "homes" to normal. When at normal, its R.S.O.N. springs restore and close the "homing" circuit to switch 8TR. Switch 8TR "homes," and when at normal restores its R.S.O.N. springs. The R.S.O.N. springs open its "homing" circuit and remove ground from lead 1G. The circuit is now at normal.

*"TY" Translation.*—(Operated: Relay 6BB and switches 8TR and 8T1.) If there is a low-resistance ground lead on either the "tip" or the "ring" side of the calling line, ground is closed to lead 5YT which closes the circuit to relay 7TY.

For busy tone without routing: strap B2 to B3. For special routing (omitting above strap), strap A2 and/or B2 individually to require terminals of group A3–A6 for first routing digit.

Strap C2 and/or D2 individually to required terminals of group C3–C6 if second routing digit is needed.

*To Provide Special Routing Directive*

Relay 7TY operates, closes a circuit to the first winding of relay 7TB, 8TD, first winding of relay 7TA, and closes the circuits to the code storage relay groups marked Codel 12 and possibly Codel 13 (depending on the strapping). Subsequent operations are as explained in the earlier section.

*To Provide Busy Tone to the Calling Party*

If, in this condition, it is desired to return busy tone to the calling party instead of a special routing, the following actions will take place. Relays 7TY, 7TA, 7TB, 8TD, and 6SB operate as explained in the preceding section with the following exception. Ground is closed to leads 8RLS and 7FB through terminals 7B2 and 7B3, instead of the operated codel relays, when 7TY operates. Subsequent operations are as explained in the earlier section.

When the Sender relay 1BB restores, the circuit releases as described earlier.

*"TT" Translation.*—(Operated: Relays 6BB and 6SA and switches 8TR and 8T1.)

*Translator Assigner Failure*

If a call requiring translation has not been extended to the Translator within a specified period, presumably due to failure of the Translator Assigner, ground from timer switch 8T1 is closed via its level B bank terminal 7 to relay 7TT.

Translator Assigner Failure provides automatic transfer of translator assigner and either sending of special routing digit or busy tone from associated ticketer.

For busy tone without routing: Strap E2 to D4, B5 to B3, F2 to F3 and F5 to F6.

For special routing (omitting above straps) strap E2 to D4, F2 to F3, F5 to F6 and E1 to F1 also strap B5 and/or B6 individually to require terminals of group A3—A6 for routing digit. A second digit may be marked (terminals C3–C6) provided each digit is "7" or higher.

*To Provide Special Routing Directive*

Relay 7TT operates, closes a circuit to the first winding of relay 7TB, 8TD, first winding of relay 7TA and the circuits to codel storage relay group marked Codel 12 and possibly Codel 13 and prepares a failure alarm circuit via lead 5AT. Subsequent operations are as explained in the earlier section with the following exceptions. Relay 7TX does not operate. Relay 6SA restores when relay 7TB operates, removes lead 5HOLD from relay 6SK, and closes the circuit for the failure alarm via lead 5AT.

*To Provide Busy Tone to the Calling Party*

If in this condition, it is desired to close busy tone to the calling party instead of a special routing, the following actions will take place. Relays 7TT, 7TA, 7TB, 8TD, and 6SB operate as explained in the preceding section with the following exception. Ground is closed to leads 8RLS and 7FB through terminals 7B5 and 7B3, instead of the operated Codel relays, when relay 7TT operates. Subsequent operations are as explained in the earlier section.

OPERATION OF CODEXER (13)

When the Transender is seized, a pulsing circuit is closed to relay 9PA via lead 5PL and level A wiper of switch 9SEQ through the Coder 12 and Transender Hunter to the Ticketer which repeats these pulses as the calling party dials them. Revertive pulsing of the "first" digit is to rotary switch 10AA via lead 1FT. All other digits pulsed are closed to the Codexer 13 via lead 5PL.

*Office or Foreign Area Code Signal Translation*

The calling party has already dialed the "first" digit, and it will be received by the Codexer 13 at any time up to the completion of the "third" digit.

Ground closed to lead 1B from the Sender circuit closes a circuit to relay 9RE. Relay 9RE operates, locks, opens a circuit between leads 1RV and 1DK, and leads 1FT and 5DD, and closes lead 1FT to switch 10AA.

Relay 9PA follows the pulses of the "second" digit received from the Ticketer and, when operated on the first pulse, closes a circuit to relay 9CA and the VERT magnet 9V. Relay 9CA operates and closes a circuit to switch 9SEQ. Switch 9SEQ operates and opens its INT springs. The VERT magnet 9V follows the pulses from relay 9PA and steps the wipers to the desired line. On the first vertical step the VON springs close. Relay 9CA remains operated during pulsing due to its slow-to-release characteristic. After the last pulse of the digit, the circuit to relay 9PA is opened. Relay 9PA restores and opens the VERT magnet 9V and the circuit to relay 9CA. The VERT magnet 9V restores. Relay 9CA restores and opens the circuit to switch 9SEQ. Switch 9SEQ restores, closes its INT springs, steps its wipers to bank contact number 1, and operates its R.S.O.N. springs. Ground via its level C wiper is closed to switch 9SEQ. Switch 9SEQ operates and opens its INT springs. The INT springs open the circuit to switch 9SEQ. Switch 9SEQ restores, advances its wipers to contact number 2, and closes its INT springs. The circuit is now ready for the "third" digit.

*Receiving the "First" Digit.*—(Operated: Relay 9RE and the R.S.O.N. Springs of Switch 9SEQ.) Assume the pulses of the first digit are closed to switch 10AA during the pulsing of the "second" digit since the "first" digit pulses must be sent no later than the end of the "third" digit. Switch 10AA follows these pulses and steps its wipers to the bank contact corresponding to the "first" digit. On the first rotary step of switch 10AA its R.S.O.N. springs operate. The INT springs close ground pulses (corresponding to the "first" digit) to lead 1RV. When the "first" digit has been received, switch 10AA restores and its INT springs remain at normal.

*Dialing the "Third" Digit of the Code.*—(Operated: Relay 9RE and the R.S.O.N. Springs of Switches 9SEQ and 10AA.) Relay 9PA follows the dial pulses received from the Ticketer and, when operated on the first pulse, closes a circuit to relay 9CA and the ROT magnet 9R. Relay 9CA operates and closes a circuit to switch 9SEQ. The ROT magnet 9R operates and follows the pulses of the digit and steps the wipers to the associated bank contact. Relay 9CA remains operated during pulsing due to its slow-to-release characteristic. At the completion of the "third" digit the circuit to relay 9PA is opened. Relay 9PA restores and opens the circuit to relay 9CA. Relay 9CA after its slow-to-release interval, restores and opens switch 9SEQ. Switch 9SEQ restores and advances its wipers to bank contact number 3, which closes a circuit to the second winding of relay 9RE in opposition to the first winding of relay 9RE via its level C wiper, closes lead 5SAO to lead 1SAL via its level D wiper to close a circuit to relay 6SA in the Coder circuit, and prepares the pulsing circuit to switch 9AB. Relay 9RE restores, closes the circuits between leads 1RV and 1DK and leads 1FT and 5DD, and disconnects lead 1FT from switch 10AA. Ground from the Translator Assigner circuit closes a circuit to relay 6SK in Coder 12 which in turn grounds lead 5AG to close a circuit to relay 10AG of this circuit. Relay 10AG operates, closes ground to lead 10HA to operate a relay in the Translator, closes lead 1ASR to the wiper cord terminals, and closes ground to the H lead corresponding to the "first" digit 9H1–9H9 via the level A and C wipers of switches 9AB and 10AA respectively, to mark the hundreds group.

When the Coder has received the translation from the Translator, ground is removed from lead 5AG to open the circuit of relay 10AG. Relay 10AG restores, removes ground from lead 10HA, opens the circuit between lead 1ASR and the wiper cord terminals, and removes ground from the selected H lead.

*Foreign Area Code With Dual Translation*

*Dialing the "Second" Digit of the Area Code.*—(Operated: VON Springs.) The calling party has already dialed the "first" digit, and it will be received by the Codexer at any time up to the completion of the "third" digit. Relay 9RE operates as explained in an earlier section.

The "second" digit of the Area code is either a "1" or a "0." For the purpose of this explanation, assume that digit "1" is dialed.

Relay 9PA follows the pulse(s) ("pulse" in this case since it is assumed a "1" is dialed) of the "second" digit received from the Ticketer and when operated on the first pulse, closes a circuit to relay 9CA and the VERT magnet 9V. Relay 9CA operates and closes a circuit to switch 9SEQ. The VERT magnet 9V follows the pulse(s) from relay 9PA and steps the wipers to the desired level. On the first vertical step, the VON springs close and the LEFT N.P. SPGS 9LNP operate. Relay 9CA remains operated during pulsing due to its slow-to-release characteristic. After the last pulse of the digit, the circuit to relay 9PA is opened. Relay 9PA restores and opens the circuit to the VERT magnet 9V and relay 9CA. The VERT magnet 9V restores. Relay 9CA restores, opens switch 9SEQ, and closes the circuit to relay 9X1. Switch 9SEQ restores, steps its wipers to bank contact number 1, and operates its R.S.O.N. springs. Switch 9SEQ steps self-interrupted to bank contact number 2 as described in the earlier section. Relay 9X1 operates, locks and prepares a circuit to switch 10CS via level C wiper to switch 9SEQ.

*Receiving the "First" Digit of the Area Code.*—(Operated: Relays 9RE and 9X1, the LEFT N.P. SPGS, and the R.S.O.N. Springs of Switch 9SEQ.) The pulses of the "first" digit are closed to switch 10AA as described in an earlier section.

*Dialing the "Third" Digit of the Area Code.*—(Operated: Relays 9RE and 9X1, the LEFT N.P. SPGS, and the R.S.O.N. Springs of Switches 9SEQ and 10AA.) Relay 9PA follows the dial pulses received from the Ticketer and, when operated on the first pulse, closes a circuit to relay 9CA, the rotary magnet 9R, and switch 10CS. Relay 9CA operates and closes a circuit to switch 9SEQ. The rotary magnet 9R and switch 10CS follow the pulses from relay 9PA and step their wipers accordingly. At the completion of the digit, the pulsing circuit to relay 9PA is opened. Relay 9PA restores, opens the pulsing circuits to the rotary magnet 9R and switch 10CS, and opens the circuit to relay 9CA. The rotary magnet 9V restores. Switch 10CS restores and advances its wipers to the contact corresponding to the third digit. Relay 9CA restores and opens the circuit of switch 9SEQ. Switch 9SEQ restores, advances its wipers to bank contact number 3 which closes a circuit to the second winding of relay 9RE in opposition to the first winding of relay 9RE via its level C wiper, and prepares a pulsing circuit to switch 9AB. Relay 9RE restores as described in an earlier section.

*Dialing Digit "A" of the Office Code.*—(Operated: Relay 9X1, the R.S.O.N. Springs of Switches 9SEQ, 10AA, and 10CS, and the LEFT N.P. SPGS.) Relay 9PA follows the pulses from the Ticketer and, when operated on the first pulse, closes a circuit to relay 9CA and to switch 9AB. Relay 9CA operates, closes a circuit to switch 9SEQ, and closes a circuit to the release magnet RLS. The release magnet RLS operates and releases the switch shaft. When the shaft returns to normal the vertical off-normal springs 10VON operate and the LEFT N.P. SPGS 9LNP restore. Switch 9SEQ operates. Switch 9AB follows the pulses from relay 9PA and steps its wiper accordingly. On its first rotary step the R.S.O.N. springs of switch 9AB operate. Relay 9CA remains operated during pulsing due to its slow-to-release characteristic.

After the last pulse of digit "A," the circuit to relay 9PA is opened. Relay 9PA restores, opens the circuit of switch 9AB and relay 9CA. Switch 9AB restores and steps its wiper to the contact corresponding to the "A" digit. Relay 9CA restores, and opens the circuit to switch 9SEQ and the release magnet RLS restores. Switch 9SEQ restores and advances its wipers to bank contact number 4 to prepare a circuit to the VERT magnet 9V.

*Dialing Digit "B" of the Office Code.*—(Operated: Relay 9X1, the R.S.O.N. Springs of Switches 9SEQ, 9AB, 10AA, and 10CS, and the VON Springs.) The "B" digit is pulsed to the vertical magnet as described for the "second" digit in section titled "Dialing the Second Digit of the Area Code" with the following exceptions. Relay 9RE does not operate, the switch 9SEQ does not step self-interrupted. The R.S.O.N. spring of switches 9SEQ, 9AB, 10AA, and 10CS are operated. At the completion of the digit, switch 9SEQ restores and advances its wipers to bank contact number 5, where its level B wiper prepares a circuit to the rotary magnet 9R.

*Dialing Digit "C" of the Office Code.*—(Operated: Relay 9X1 and the R.S.O.N. Springs of Switches 9SEQ, 9AB, 10AA and 10CS.) The digit "C" is pulsed to the rotary magnet 9R as described in the earlier section except relay 9RE does not restore (since it was not operated) at the completion of the digit. At the completion of the digit, switch 9SEQ and relays 9PA and 9CA restore. When switch 9SEQ restores and advances its wipers to bank contact number 6, a multiple ground is closed to relay 9X1 via its level C wiper, and closes lead 5SAO to lead 1SAL directly via its level D wipers.

Ground via lead 5AG closes a circuit to relay 10AG as described earlier. Relay 10AG operates, closes ground via bank contacts and wipers of switches 10CS, 10AA, and 9SEQ to one of the "F" leads (10FA–10FF) to close the bar relay for the associated area, closes lead 1ASR to the wiper cord terminals, and closes ground to one of the "H" leads (10H1–10H9) to mark the hundred group.

After the Coder 12 has received the translated information from the Translator, ground is removed from lead 5AG to open the circuit of relay 10AG. Relay 10AG restores, removes ground from the marked "H" lead and "F" lead, and removes lead 1ASR from the wiper cord terminals.

*Release From a Foreign Area Call With Dual Translation.*—(Operated: Relay 9X1 and the R.S.O.N. Springs of Switches 9SEQ, 9AB, 10AA, and 10CS.) At the completion of the translated information, ground via lead 5HM is closed to switch 9SEQ. Switch 9SEQ operates and opens its INT springs. The INT springs open the circuit to the motor magnet of switch 9SEQ. Switch 9SEQ restores, closes its INT springs, and advances its wipers to contact number 7. When switch 9SEQ steps from contact number 6 to number 7 relay 9X1 is opened and the circuit between leads 5SAO and 1SAL is opened. Relay 9X1 restores. Switch 9SEQ continues to "home" to normal self-interruptedly and, when at normal, its R.S.O.N. springs restore, open the "homing" circuit to switch 9SEQ, and close a "homing" circuit to switch 9AB. Switch 9AB operates and "homes" to normal self-interruptedly. When at normal, its R.S.O.N. springs restore, open the "homing" circuit to switch 9AB, and close the "homing" circuit to switch 10AA. Switch 10AA "homes" to normal self-interruptedly and, when at normal, restores its R.S.O.N. springs to open switch 10AA and close ground to the release magnet RLS. The RLS magnet operates and releases the switch shaft. When the shaft returns to normal the vertical off normal springs 10VON operate, to open the RLS magnet circuit. The RLS magnet restores. The circuit is now at normal.

OPERATION OF SENDER (11)

*Seizure*

When a Ticketer is seized on an originating call, its associated Transender Hunter operates to connect it to an idle Transender. When the Transender Hunter finds an idle Transender, ground is closed to lead 1HT which closes a circuit to relay 1BB. Relay 1BB operates, grounds lead 1B at contacts 1BB6 to operate relay 6BB in the Coder 12 and relay 9RE in the Codexer 13, closes resistance 1R8 and 1R3 ground respectively to leads 1TB and 1ML, short circuits the first winding of relay 1TS, grounds lead 1UM, and closes ground through the second winding of relay 2RS to leads 8E and 1SC.

When the first digit has been received by the Ticketer (operation of switch 8T1 in the Coder), the Ticketer closes resistance battery to lead 1SC which closes a circuit to the first winding of relay 2RS. Relay 2RS operates, locks via ground on lead 7RSH from the Coder, closes a path to the first winding of relay 3CT, opens detection time-out lead 2T1 from lead 2ZT, and grounds lead 3CG. Relay 3CT operates, locks via ground on contacts 1BB7, prepares the circuit to switch 8TR in the Coder 12 via lead 8MM, closes lead 3CA to 3CM, opens leads 3SK and 4SJ, and closes ground to leads 1SAL and 3SAK. The Codexer 13 now receives the digits from the Ticketer and sets them up for translation by the Translator.

When a translation has been received or the Coder 12 has been marked for a special routing directive and sending is to start, ground is closed to lead 3SB which closes a circuit to relay 2SB. Leads 24VAC and 4MOT are closed in the Coder 12 which closes the circuit to the synchronous motor of the pulse generator 4PGU. Relay 2SB operates, locks, closes lead 1DK to lead 3CT, opens lead 1DK from lead 2KT, closes lead 4P7 from the pulse generator 4PGU preparatory to the operation of relay 2PE, closes the outgoing loop leads 1SR and 1ST to seize the Ticketer Selector or trunk circuit, and opens the second winding of relay 2RS. The pulse generator 4PGU operates and closes ground pulses to lead 4P7.

*Sending the Routing Directive*

*The Control Digit.*—(Operated: Relays 1BB, 2RS, 3CT, and 2SB.) The combination of relays 2RS and 3CT operated establish the control digit pulsing condition. Pulses are not transmitted to the outgoing loop on this digit. The first ground pulse from the pulse generator closes a circuit to relay 2PE. The operating path of relay 2PE is: resistance battery via resistor 2R5A, contacts 3CT6 of operated relay 3CT, bank contacts N of switch 4S2 level A at normal, and contacts of unoperated relay 2PB; a ground pulse via lead 4P7, contacts of unoperated relays 2PF and 2PB, contacts 2SB6 of operated relay 2SB, and to lead 4P7 which is connected to the pulse generator. Relay 2PE operates and short circuits relay 2PF at contacts 2PE5. When the ground pulse is removed, the short circuit is removed from relay 2PF.

Relay 2PF operates in series with relay 2PE, closes an additional series circuit to itself and relay 2PE, closes the pulsing circuit to switch 4S1, grounds lead 8MM which operates switch 8TR in the Coder 12, and closes a pulsing circuit to the Ticketer via lead 1SC.

Levels A and B of switch 4S1 are connected to levels C, D, E, and F of switch 8TR in the Coder circuit 12 via leads 8W, 8X, 8Y, and 8Z. Shunt field relay 4PC is connected to wipers A and B of switch 4S1 and operates only when both wipers are simultaneously connected to ground. This occurs when the wipers of switch 4S1 are stepped to the terminal corresponding to the digit marked via leads 8W, 8X, 8Y, and 8Z.

Switch 4S1 follows the ground pulse from the pulse generator and steps its wipers. On the first step, its R.S.O.N.1 springs operate and close a circuit to relay 3PG. Relay 3PG operates, closes a multiple ground to relay 2PB. Switch 4S1 steps with each pulse until its wipers reach the terminals marked with the sending control digit in the Coder 12 (via leads W11, X11, Y11, and Z11). When the sending control digit is reached, ground is closed to both windings of relay 4PC. Relay 4PC operates and closes a circuit to relay 2PB. Relay 2PB operates, locks, removes ground from lead 7RSH, changes the pulsing path from switch 4S1 to switch 4S2, removes ground from lead 8MM, and opens the pulsing path via lead 1SC to the Ticketer. Switch 8TR in the Coder 12 restores and advances its wipers one step which removes the control digit from leads 8W–8Z and causes the relay circuit 2PE to be opened, unless the first routing digit is the same as a control digit.

The circuit to relays 2PE and 2PF is opened when relay 2PB operates. Relays 2PE and 2PF restore. Relay 2PE closes a "homing" circuit to switch 4S1, closes a multiple ground to relay 3CT, and closes resistance battery to lead 8PE. Relay 2PF opens the pulsing circuit to switch 4S2, and removes ground from lead 2PM. Switch 4S1 "homes" to normal self-interrupted via its interrupter and off-normal springs, and opens the circuit to relay 4PC (if operated). When at normal its off-normal springs restore, open the "homing" circuit, and open the circuit to relay 3PG. Relay 4PC restores. Relay 3PG restores, opens the circuit to relay 2RS, opens the circuit to relay 2PB. Relay 2RS restores, closes leads 2T1 and 8RLS, and removes ground from lead 3CG.

*Translated Routing Directive via Dial-Pulses.*—(Operated: Relays 6BB, 3CT, and 6SB.) The first ground pulse from the pulse generator (after relay 2PB restores), closes a circuit to relay 2PE. Relay 2PE operates, and short circuits relay 2PF. When the ground pulse is removed, the short circuit is removed from relay 2PF. Relay 2PF operates, closes the pulsing circuit to switch 4S1, grounds lead 8MM which operates switch 8TR in the Coder 12, and removes the short circuit from leads 1ST and 1SR. As the pulse generator pulses switch 4S1, it also opens the loop via leads 1ST and 1SR which steps the Ticketer Selector (or subsequent switches) via the Ticketer. Switch 4S1 follows the ground pulses and steps its wipers. On the first step, its R.S.O.N. springs operate and close a circuit to relay 3PG. Relay 3PG operates, and locks. Switch 4S1 steps with each pulse until its wipers reach the terminals marked (via leads W12, X12, Y12 and Z12 in the coder), the first digit of the routing directive stored in the Coder 12.

When the first digit of the routing directive is reached, ground is closed to both windings of relay 4PC. Relay 4PC operates and closes a circuit to relay 2PB. Relay 2PB operates, locks, removes ground from lead 7RSH, changes the pulsing path from switch 4S1 to 4S2, short circuits leads 1SR and 1ST to terminate the loop pulsing, removes ground from lead 8MM, and opens the circuit to relay 3CT. Relay 3CT restores, opens leads 3CA and 3CM, and removes ground from leads 1SAL and 3SAK. Switch 8TR of the Coder 12 restores (when ground is removed from lead 8MM), advances its wipers one step to code storage relay group 13, which removes the first digit marking from leads 4W–4Z, and opens the circuit to relay 4PC. Relay 4PC restores, unless the digit stored in code storage relay group 13 is the same as in code storage relay group 12.

*Interdigital Pause.*—(Operated: Relays 1BB, 6SB, 2PE, 3PG, and possibly 4PC and the off-normal springs of switch 4S1.) The pulse generator closes the ground pulse to switch 4S2 which operates and steps its wipers. On the first step, its off-normal springs operate and close the "homing" circuit to switch 4S1. Switch 4S1 "homes" to normal self-interrupted via its interrupter and off-normal springs and opens the circuit to relay 4PC. When at normal, the off-normal springs restore and open the "homing" circuit. Relay 4PC restores. Switch 4S2 continues to step its wipers and, when ground is encountered on leads 4W, 4X, 4Y, or 4Z, the circuit is closed to relay 3CT. Relay 3CT operates and locks as previously described.

As switch 4S2 takes the fifth step, the circuit is opened to relays 2PE and 2PF. Relay 2PE restores and opens the circuit to relay 3PG. Relay 2PF restores, opens the pulsing circuit to switch 4S2, and removes ground from lead 2PM. Relay 3PG restores, closes the "homing" circuit to switch 4S2, closes leads 3SK and 4SJ. Switch 4S2 "homes" to normal self-interrupted via its interrupter and off-normal springs. When at normal, its off-normal springs restore, open the "homing" circuit and open the circuit to relay 2PB. Relay 2PB restores as previously described and prepares the circuit to relay 2PE to start the second digit cycle.

*Translated Routing Directive Continued.*—(Operated: Relays 1BB, 2SB, and 3CT.) The digit sending cycle for the second, third, fourth, fifth, and sixth digits (if stored) is the same as for the first digit, as described in the preceding section. All the digits to be sent are marked on leads W12 to Z17 and are extended through levels C, D, E, and F of switch 8TR in the Coder 12 through levels A and B of switch 4S1 to relay 4PC. After each digit has been sent Coder switch 8TR advances one step to mark the next digit.

When the last stored digit of the directive has been sent, relay 3CT will not find an operating ground during the interdigital interval. With 3CT and 3PG restored, leads 4SJ and 3SK complete a path to switch 8TR in the Coder 12. Switch 8TR steps its wipers self-interrupted to bank terminal 9. Leads 8W, 8X, 8Y, and 8Z are now connected through levels C, D, E, and F of the Coder switch 8TR to leads WP, XT, YT, and ZT which are associated with the called number storage in the Ticketer. An operating circuit is prepared to relay 2PE via lead 1SC, level B of switch 4S2 at normal, lead 8E which is closed to lead 8PE via level B of switch 8TR (9th bank terminal) in the Coder 12.

*Sending the Called Number*

*Dial-Pulsing Used.*—(Operated: Relays 1BB and 2SB.) The control digit which was sent previously, conditions the Ticketer to absorb those digits of the called number which are not required to be sent. A switch of the Ticketer steps its wipers accordingly and connects ground from the associated codel leads in the Ticketer. This ground is forwarded from the Ticketer, through the Transender Hunter, and through the Coder to leads 8W, 8X, 8Y, and 8Z in this circuit.

Resistance battery on lead 1SC is supplied from the Ticketer whenever a digit is ready for sending and prepares the operating circuit to relay 2PE. A ground pulse from the pulse generator closes a circuit to relay 2PE. Relay 2PE operates and short circuits relay 2PF at contacts 2PE5. When the ground pulse is removed, the short circuit is removed from relay 2PF. Relay 2PF operates and removes the short circuit from leads 1ST and 1SR. As the pulse generator pulses switch 4S1, it also opens and closes the loop via leads 1ST and 1SR which steps the Ticketer Selector (or subsequent switches). Switch 4S1 follows the ground pulses and steps its wipers. On the first step, its R.S.O.N. springs operate and close a circuit to relay 3PG. Relay 3PG operates, locks. Switch 4S1 steps with each pulse until its wipers reach the terminals marked via leads from the Ticketer. The ground markings will be encountered in this circuit on leads 8W, 8X, 8Y, and 8Z. When ground is encountered, both windings of relay 4PC are closed. Relay 4PC operates and closes a circuit to relay 2PB. Relay 2PB operates, locks, removes ground from lead 7RSH, opens the pulsing path to switch 4S1 and closes it to switch 4S2, and short circuits leads 1SR and 1ST to terminate the loop pulsing.

*Interdigital Pause.*—(Operated: Relays 1BB, 6SB, 2PE, 2PF, 3PG, 4PC, and 2PB and the R.S.O.N. springs of switch 4S1.) The pulse generator closes the ground pulses to switch 4S2 which operates and steps its wipers. Subsequent operation, to establish an interdigital interval, proceeds as explained in an earlier section. The release of relay 2PF, when switch 4S2 reaches the fifth rotary position, removes ground from lead 1SC which terminates the sequencing pulse to the Ticketer. A switch in the Ticketer advances its wipers one step to extend the codel markings for the next digit.

The circuit continues to operate as explained earlier with the following exceptions. Relay 3CT does not operate. Switch 8TR in the Coder does not step its wipers, but remains in the 9th position until all of the called number has been translated. The Sender must find resistance battery via lead 1SC, as a condition for further sending. If lead 1SC is open, no additional digits will be sent.

*Called Number Sending Continued.*—(Operated: Relays 1BB and 2SB.) The digit sending cycle for succeeding digits to be sent is the same as previously explained. The sequencing pulse on lead 1SC following the sending of the last digit in the called number storage in the Ticketer causes the Ticketer to switch through and release the Transender.

*Release—Dial Pulse Control Used.*—(Operated: Relays 1BB and 6SB.) When the Ticketer switches through, ground is removed from lead 1HT which opens the circuit of relay 1BB. By this time switch 8TR in the Coder 12 has operated and stepped its wipers to bank terminal number 10 where the "ST" signal is wired in. Relay 1BB restores, removes resistance 1R3 ground from leads 1TB and 1ML, removes the short circuit from the first winding if relay 1TS, and removes ground from lead 1B. Ground removed from lead 1B opens the circuit of relay 6BB in the Coder 12. When Coder relay 6BB restores, it closes ground via lead 8RLS to relay 1TS. Relay 1TS operates, closes ground to lead RLS. ALM, grounds lead 1G, and closes lead 120 IPM to lead 1ML. Other relays in the Coder 12 restore, remove ground from lead 3SB which opens the circuit of relay 2SB, and opens the circuit to the pulse generator. Relay 2SB restores, opens the pulsing circuit, and opens the line loop. The pulse generator restores. Switch 8T1 in the Coder "homes" to normal. Its R.S.O.N. springs restore and open the circuit to the second winding of relay 1TS. When switch 8TR in the Coder "homes" to normal its R.S.O.N. springs restore and open the circuit to the second winding of relay 1TS. Relay 1TS restores, removes ground from leads RLS ALM and 1G, and removes lead 120 IPM from lead 1ML. The circuit is now at normal.

*Supervision*

*Stop-Dial Supervision.*—(Operated: Relays 1BB, 6SB, 2PE, and 3CT.) If a stop-dial condition is encountered ground via lead 1PHC closes a circuit to relay 3PH. The stop-dial condition is generally encountered just before relay 2PF operates during digit translation, or if encountered during digit translation it will not interrupt the digit in progress. The stop-dial condition discontinues further sending until removed or switch 8T1 times out. Relay 3PH operates, short circuits relay 2PF to prevent its operation, and closes its second winding to the pulse generator. The circuit remains in this condition with relay 2PE following the pulses from the pulse generator until the stop-dial condition is removed.

When the stop-dial condition is removed from lead 1PHC which opens the circuit to relay 3PH. If a ground is in progress, relay 3PH will not be opened until it is removed. Relay 3PH restores, removes the short circuit from relay 2PF, and removes its second winding from the pulse generator. The circuit is ready for the next digit to be sent.

*30 I.P.M. Flash Busy or Off-Hook.*—(Operated: Relays 1BB, 6SB, 2PE, 2PF, 3PG, 2PB, and 3CT and the R.S.O.N. Springs of Switch 4ST.) Generally, the off-hook condition is encountered during the interdigital cycle. A ground pulse via lead 1PHC closes a circuit to relay 3PH. Relay 3PH operates, closes its second winding to the pulse generator, short circuits relay 3PJ, closes level A bank contact number 5 of switch 4S2 to bank contact multiple, and closes a multiple holding circuit to relay 2PB.

When the ground is removed from lead 1PHC, the short circuit is removed from 3PJ. After its slow-to-operate interval, relay 3PJ operates in series with relay 3PH and prepares a circuit to relay 2FB. Relays 2PE and 2PF normally release on bank terminal number 5 of switch 4S2, however, in this case, remain operated which keeps switch 4S2 stepping. When bank terminal number 10 is reached relay 3PK is closed in series with relays 2PE and 2PF. Relay 3PK operates, locks, and closes a circuit for relay 3PL to bank contact number 9. Switch 4S2 continues stepping a second cycle, and when it steps to bank terminal number 9, relay 3PL is closed in series with relays 2PE and 2PF. Relay 3PL operates, locks and opens bank terminal number 5 from the multiple.

When switch 4S2 encounters bank terminal number 5 on the third cycle, the circuit is opened to relays 2PE and 2PF. By this time, ground via lead 1PHC closes a circuit to relay 2FB. If this is a checking operator call, ground will not be closed to relay 2FB until the checking operator informs the calling party that the call cannot be completed.

Relay 2PE restores and opens the circuit to relay 3PG. Relay 2PF restores, opens the pulsing circuit to switch 4S2, removes ground from lead 2PM, and opens the circuits of relays 3PK, 3PL, 3PH, and 3PJ. Relay 2FB operates, grounds lead 1G, opens one side of the pulsing loop, closes its first winding, closes a multiple circuit between leads MOT and 24 VAC, and grounds lead 7FB which closes a circuit to relay 1TS via lead 8RLS. Leads 7FB and 8RLS are closed together in the Coder 12. Relay 1TS operates (it is somewhat slow to operate because its 5 ohm winding is shunted), closes ground to lead 1G, closes lead 120 IPM to lead 1ML, and opens the circuit of relay 1BB by removing it from lead 1HT. Relay 1BB restores, removes resistance 1R8 and 1R3 grounds from leads 1TB and 1ML respectively, removes ground from leads 1B and 7FB (which removes a multiple ground from the second winding of relay 1TS), and opens the circuit of relay 2FB. Ground removed from lead 1B opens the circuit of relay 6BB in the Coder. When Coder relay 6BB restores, it closes a multiple ground to relay 1TS via lead 8RLS. Relay 2FB restores, removes a multiple ground from lead 1G, closes one side of the line loop, and opens a multiple circuit between leads MOT and 24 VAC. Relay 3PG restores, closes a "homing" circuit to switch 4S2. Relays 3PK, 3PL, 3PJ, and 3PH restore. Switch 4S2 "homes" to normal via its INT and R.S.O.N. springs. When at normal, its R.S.O.N. springs restore, open the "homing" circuit, and open the circuits to relays 2PB and 3CT. Relay 2PB restores. Relay 3CT restores, opens leads 3CA and 3CM, closes leads 3SK and 4SJ. Additional relays in the Coder 12 restore, remove ground from lead 3SB which opens the circuit of relay 2SB, and open the circuit to the pulse generator. Relay 2SB restores, opens the pulsing circuit, and opens the line loop. The pulse generator restores. Switch 8T1 in the Coder "homes" to normal, and its R.S.O.N. springs restore and open the circuit to the second winding of relay 1TS. When Coder switch 8TR "homes" to normal its R.S.O.N. springs restore and open the circuit to the first winding of relay 1TS. Relay 1TS restores, removes ground from leads RLS ALM and 1G, and removes lead 120 IPM from lead 1ML. The circuit is now at normal.

When relay 1TS operated and disconnected resistance battery (relay 1BB) from lead 1HT, the Ticketer responded by opening its connection to the Transender. Busy tone is closed to the calling party on automatic number identification calls.

*60 or 120 IPM Flash Busy.*—(Operated: Relays 1BB, 2SB, 2PE, 2PF, 3PG, 2PB, and 3CT and the R.S.O.N. Springs of Switch 4S2.) Operations are as explained in the preceding section with the following exception. Relays 3PK and 3PL will not operate, since the second pulse of the busy flash will be received before the wipers of switch 4S2 have reached bank terminal number 10 on the first cycle.

*Translation Fault in the Coder Circuit.*—(Operated: Relays 1BB, 3CT, and 2RS.) If, for some reason, a fault is encountered and the Coder 12 fails to release the Translator and Translator Assigner promptly, a slow-to-release relay restores in the Assigner and closes ground to lead 1SL via lead ASSIGN in the Coder. Ground on lead 1SL closes a circuit to the first winding of relay 1SL. Relay 1SL operates, locks via its second winding, opens the loop, opens the operating path to relay 2PE, removes ground from lead 1SAL, grounds lead 8RLS and closes a circuit to relay 1TS. Relay 1TS operates, locks, transfers the holding circuit of relay 1BB from lead 1HT to ground at contacts 3CT5, grounds lead 1G, grounds lead RLS ALM, and closes lead 120 IPM to lead 1ML. The Ticketer responds as described in an earlier section closing busy tone to the calling party. The circuit is held in this condition until the BUSY KEY is operated. To make this circuit available for other calls, the BUSY KEY is operated opening the circuit to relay 1SL. Relay 1SL restores, opens the circuit to relay 1TS, removes ground from lead 8RLS, and opens the circuit of relay 1BB. Relay 1TS restores as previously described. Relay 1BB restores as previously described, and also opens the circuits to relays 2RS and 3CT. Relays 2RS and 3CT restore as previously described. The circuit is now at normal.

*Relay 4PC Fails To Operate—Sending Fault.*—(Operated: Relays 1BB, 2SB, 2PE, 2PF, 3PG, and possibly 3CT and the R.S.O.N Springs of Switch 4S1.) If relay 4PC fails to operate, switch 4S1 continues stepping until at normal. When at normal, its R.S.O.N. springs restore and close a circuit to relay 1SL. Relay 1SL operates as described in the preceding section, and also opens the circuit to relays 2PE and 2PF. Relay 2PE restores and opens the circuit to relay 3PG. Relay 2PF restores as previously described. Relay 3PG restores. Relay 1TS operates (when closed by 1SL) as described in the previous section. The Ticketer responds to the opening of lead 1HT and closes busy tone to the calling party.

The circuit is released by operating the BUSY KEY as described in the preceding section, except relay 2SB restores when ground is removed from lead 3SB.

If relay 3CT is not operated, which indicates that a faulty digit marking condition is in the Ticketer, ground is closed to relay 1TS via lead RLS. After an interval normally sufficient for the calling party to have completed dialing, relay 1TS operates as previously described. The Ticketer locks busy and gives an alarm and the Transender is released.

*Special Translations*

When the Coder 12 is wired to give special translations the following occurs. For example, if a "TX" Translation occurs ground is closed to leads 8RLS and 7FB.

Ground via lead 7FB closes a circuit to the first winding of relay 2FB which operates as previously described. The important function of relay 2FB, at this time, is to close a multiple ground to relay 1TS to assure its operation. Relay 1TS operates and releases the Sender 11 as previously described.

*Monitoring and Testing*

A monitor lamp connected to lead 1ML is provided at a monitor panel (not shown) for each Transender. When the Sender 11 BUSY KEY is operated, the condition is indicated by a steady bright lamp.

Normal seizure of the Transender is indicated by a steady dim lamp. Releasing cycle and locked busy conditions are indicated by flashing the monitor lamp at 120 IPM. A delayed alarm is actuated if relay 1TS remains operated for an abnormally long time. In this case, the release alarm lamp on the Sender 11 also lights.

The Transender may be accessed from the monitor panel for routing testing. Ground via lead 1RC closes a circuit to relay 1RC. Relay 1RC operates, grounds lead 1G, closes a circuit to relay 1RR, connects lead 1ZTC to lead 2T1, and closes the Transender to the test multiple leads. Relay 1RR operates, closes a multiple ground to lead 1G, closes the pulse generator, and closes additional test multiple leads. The circuit operates as previously described.

When the test is completed, ground is removed from lead 1RC, opening the circuit to relay 1RC. Relay 1RC restores and opens the circuit of relay 1RR. Relay 1RR restores.

*Three-Digit Translation*

*Seizure.*—The translator is seized, when the codexer closes ground to lead 10HA which completes a circuit to relay 12HA. Relay 12HA operates, and closes circuits at contacts 12HA1 and 12HA2 to a group of bar relays which extend a group of code leads from the codexer strowger switch bank to the code assignment jumper field shown in FIGURE 12. If this were a call to a different area as determined by the codexer a circuit would be closed to a relay such as 12FF to complete the circuit for another group of code leads from the codexer. The operation of the bar relays extend the contacts to the code assignment jumper field and the translator jumper field to the coil of a particular one of the translator bar relays such as relay 12TR1 illustrated. Strapping on the contact assembly of the bar relay is arranged to provide the proper routing for the destination forwarded from the transender. The code leads within each area group which require identical routing and control marking are "bunched" at the code assignment jumper field and treated as a single code lead, when such grouping does not conflict with the grouping in another area code. The jumper wiring of the code assignment jumper field causes only one translator bar relay to operate in the translator. Therefore, only one lead out of a possible 900 code leads extends ground from the codexer to close the circuit for the proper bar relay. The required routing directive for this particular call is marked to the coder in accordance with the strapping of its contacts.

When the coder has received a routing directive, ground is removed from the marked code lead and lead 10HA in this instance which opens a circuit to relay 12HA, and bar relay 12TR1. Relay 12HA restores opens the circuits to the bar relays 12BAR and 12BAR'. These bar relays restore. The circuit is now ready to handle another translation. When a specific pattern of blocking calls selectively is required, on the basis of the originating point, the originating class bar relays such as 12CL1B and 12LOC are provided. Detector battery, is closed to the C lead of the incoming trunk which lead is connected through a grouping jumper field through resistor 12R, neon tube 12NE and relay 12CLI. The relay 12CLI operates and closes the circuit to its associated slave relay 12CLSI. The slave relay 12CLSI operates, closes ground from lead 12LCL to one of the bar relays such as bar relay 12CL1B and opens the circuit to relay 12LOC to prevent bar relay 12LOC from operating to give a local translation. The bar relay 12CL1B operates indicating the appropriate originating class and extends the code leads marked 12CLO via one of the possible routing objectives to the proper translator bar relay for this originating group. When translation is completed, ground is removed from lead 12LCL opening the circuit to bar relay 12CL1B and the ticketer removes detector battery from the trunk C lead thereby extinguishing the neon tube 12NE. All of the relays restore and the translator is again available for a new translation.

While only one embodiment of the invention has been disclosed, it will be understood that various modifications may be made therein which are within the true spirit and scope of the invention.

What is claimed is:

1. In an automatic toll ticketing telephone system, a first exchange including switching equipment, a plurality of trunks to other exchanges, a ticketer accessible to said equipment, a transender accessible to said ticketer, a translator accessible to said transender, an incoming trunk line from another exchange, said ticketer also accessible to said incoming trunk and said trunk having talking conductors and a control conductor, means for extending a connection from a line in the first exchange to said ticketer and for connecting a transender and a translator to the ticketer during the progress of the call, means in the translator operated in response to the receipt of a called party directive to return a first routing to said transender to extend the call, means in the sender operated when the ticketer is seized from the incoming trunk to send a signal to the ticketer in response to the receipt of the same called party directive during the progress of a call, and means in the ticketer operated in response to the receipt of said signal to apply an increased potential to the control conductor of said incoming trunk, and means in the translator connected to said control conductor and operated by said increased potential to return a second routing to said transender to extend the call from said incoming trunk.

2. An automatic toll ticketing telephone system such as claimed in claim 1, in which there is a high voltage relay and a gas diode in the translator, said relay and diode connected in series and connected to the control conductor of said incoming trunk, said relay responsive only to said increased potential to change the connections in said translator to return the different routing directive.

3. An automatic toll ticketing telephone system such as claimed in claim 1, in which there are a plurality of incoming trunks having access to said ticketer, and a jumper field in said translator, each incoming trunk having a control conductor connected to one side of said jumper field with a plurality of high voltage relays connected to the other side of said jumper field, and connections in said jumper field connecting different ones of said high voltage relays to the control conductors of said trunks, said relays comprising the means in the translator operated by said increased potential to return different routings dependent upon the relay connected to the control conductor of the trunk which seized the ticketer.

References Cited in the file of this patent

UNITED STATES PATENTS

| | | |
|---|---|---|
| 2,698,879 | Shepherd | Jan. 4, 1955 |
| 2,848,543 | Breed | Aug. 19, 1958 |
| 2,918,533 | Leonard et al. | Dec. 22, 1959 |
| 2,928,903 | Bellamy et al. | Mar. 15, 1960 |
| 2,955,163 | Ostline | Oct. 4, 1960 |
| 2,998,493 | Gibson | Aug. 29, 1961 |
| 3,025,357 | Jacobitti | Mar. 13, 1962 |